United States Patent
Von Busch et al.

(10) Patent No.: US 12,169,529 B1
(45) Date of Patent: *Dec. 17, 2024

(54) SYSTEMS AND METHODS OF MANAGING A DATABASE OF ALPHANUMERIC VALUES

(71) Applicant: Experian Information Solutions, Inc., Costa Mesa, CA (US)

(72) Inventors: Kirsten Marie Von Busch, Palatine, IL (US); Ryan B. Cain, Aurora, IL (US); Dominic Edward DeGuiseppe, Naperville, IL (US); Wen Zhang, Streamwood, IL (US); Erik Peter Hjermstad, Lincoln, NE (US)

(73) Assignee: EXPERIAN INFORMATION SOLUTIONS, INC., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,847

(22) Filed: Dec. 11, 2023

Related U.S. Application Data

(63) Continuation of application No. 18/066,198, filed on Dec. 14, 2022, now Pat. No. 11,886,519, which is a
(Continued)

(51) Int. Cl.
 *G06F 16/00* (2019.01)
 *G06F 16/23* (2019.01)
 (Continued)

(52) U.S. Cl.
 CPC ........ *G06F 16/951* (2019.01); *G06F 16/2365* (2019.01); *G06F 16/248* (2019.01);
 (Continued)

(58) Field of Classification Search
 CPC ............... G06F 16/951; G06F 16/2365; G06F 16/248; G06F 16/27
 See application file for complete search history.

(56) References Cited

U.S. PATENT DOCUMENTS

| | | |
|---|---|---|
| 4,989,144 A | 1/1991 | Barnett, III |
| 5,120,704 A | 6/1992 | Lechter et al. |

(Continued)

FOREIGN PATENT DOCUMENTS

| | | |
|---|---|---|
| EP | 0 749 081 | 12/1996 |
| EP | 1 122 664 | 8/2001 |
| JP | 09-251486 | 9/1997 |
| JP | 10-222559 | 8/1998 |
| JP | 10-261009 | 9/1998 |

(Continued)

OTHER PUBLICATIONS

"Activant PartExpert with Vehicle Identification Number (VIN) Lookup", Activant Solutions, Inc., Livermore, CA, Copyright 2006, http://counterworks.com/PartExp_DS_092806.pdf, pp. 2.
(Continued)

*Primary Examiner* — Noosha Arjomandi
(74) *Attorney, Agent, or Firm* — Knobbe, Martens, Olson & Bear, LLP

(57) ABSTRACT

One aspect of the subject matter described herein comprises a database management system. The database management system comprises a communication circuit, an interface, and a processor. The communication circuit receives information from databases via a communication network. The interface allows user operation and interaction via the communication network and the database management system. The processor provides data to and receives data from the interface, including a plurality of alphanumeric records comprising at least one unique identifier, obtains database records from other databases for each unique identifier, identifies a number of alphanumeric records in the plurality having events in their histories, determines a percentage of alphanumeric records in the plurality having negative events in their histories, generates a report including the determined percentages, and conveys the report to the user.

20 Claims, 12 Drawing Sheets

Related U.S. Application Data continuation of application No. 17/455,368, filed on Nov. 17, 2021, now Pat. No. 11,568,005, which is a continuation of application No. 16/521,414, filed on Jul. 24, 2019, now Pat. No. 11,210,351, which is a continuation of application No. 15/624,609, filed on Jun. 15, 2017, now Pat. No. 10,409,867.

(60) Provisional application No. 62/351,241, filed on Jun. 16, 2016.

(51) Int. Cl.
  *G06F 16/248* (2019.01)
  *G06F 16/27* (2019.01)
  *G06F 16/951* (2019.01)
  *G08B 21/18* (2006.01)
  *H04L 67/10* (2022.01)

(52) U.S. Cl.
  CPC ............ *G06F 16/27* (2019.01); *G08B 21/182* (2013.01); *H04L 67/10* (2013.01)

(56) References Cited

U.S. PATENT DOCUMENTS

| | | |
|---|---|---|
| 5,201,010 A | 4/1993 | Deaton et al. |
| 5,216,612 A | 6/1993 | Cornett et al. |
| 5,488,360 A | 1/1996 | Ray |
| 5,532,838 A * | 7/1996 | Barbari ............ H04N 1/32782 |
| | | 358/444 |
| 5,587,575 A | 12/1996 | Leitner et al. |
| 5,630,070 A | 5/1997 | Dietrich et al. |
| 5,748,098 A | 5/1998 | Grace |
| 5,765,143 A | 6/1998 | Sheldon et al. |
| 5,819,234 A | 10/1998 | Slavin et al. |
| 5,878,403 A | 3/1999 | DeFrancesco |
| 5,940,812 A | 8/1999 | Tengel et al. |
| 5,950,169 A | 9/1999 | Borghesi et al. |
| 5,963,129 A | 10/1999 | Warner |
| 5,995,947 A | 11/1999 | Fraser et al. |
| 6,006,201 A | 12/1999 | Berent et al. |
| 6,038,554 A | 3/2000 | Vig |
| 6,052,065 A | 4/2000 | Glover |
| 6,052,068 A | 4/2000 | Price R-W et al. |
| 6,076,064 A | 6/2000 | Rose, Jr. |
| 6,126,332 A | 10/2000 | Cubbage et al. |
| 6,154,152 A | 11/2000 | Ito |
| 6,182,048 B1 | 1/2001 | Osborn et al. |
| 6,208,979 B1 | 3/2001 | Sinclair |
| 6,236,977 B1 | 5/2001 | Verba et al. |
| 6,259,354 B1 | 7/2001 | Underwood |
| 6,278,936 B1 | 8/2001 | Jones |
| 6,282,517 B1 | 8/2001 | Wolfe et al. |
| 6,330,499 B1 | 12/2001 | Chou et al. |
| 6,330,546 B1 | 12/2001 | Gopinathan et al. |
| 6,430,539 B1 | 8/2002 | Lazarus et al. |
| 6,516,239 B1 | 2/2003 | Madden et al. |
| 6,587,841 B1 | 7/2003 | DeFrancesco |
| 6,609,108 B1 | 8/2003 | Pulliam et al. |
| 6,714,859 B2 | 3/2004 | Jones |
| 6,738,748 B2 | 5/2004 | Wetzer |
| 6,754,564 B2 | 6/2004 | Newport |
| 6,760,794 B2 | 7/2004 | Deno et al. |
| 6,772,145 B2 | 8/2004 | Shishido |
| 6,804,606 B2 | 10/2004 | Jones |
| 6,839,682 B1 | 1/2005 | Blume et al. |
| 6,904,359 B2 | 6/2005 | Jones |
| 6,938,021 B2 | 8/2005 | Shear et al. |
| 6,959,281 B1 | 10/2005 | Freeling et al. |
| 6,980,963 B1 | 12/2005 | Hanzek |
| 7,024,418 B1 * | 4/2006 | Childress ............... G06Q 10/10 |
| | | 707/999.102 |
| 7,050,982 B2 | 5/2006 | Sheinson et al. |
| 7,069,118 B2 | 6/2006 | Coletrane et al. |
| 7,092,898 B1 | 8/2006 | Mattick et al. |
| 7,113,853 B2 | 9/2006 | Hecklinger |
| 7,130,821 B1 | 10/2006 | Connors et al. |
| 7,181,427 B1 | 2/2007 | DeFrancesco |
| 7,184,974 B2 | 2/2007 | Shishido |
| 7,191,058 B2 | 3/2007 | Laird et al. |
| 7,228,298 B1 | 6/2007 | Raines |
| 7,288,298 B2 | 6/2007 | Raines |
| 7,275,083 B1 | 9/2007 | Seibel et al. |
| 7,366,694 B2 | 4/2008 | Lazerson |
| 7,392,203 B2 | 6/2008 | Edison et al. |
| 7,392,221 B2 | 6/2008 | Nabe et al. |
| 7,418,408 B1 | 8/2008 | Heppe |
| 7,421,322 B1 | 9/2008 | Silversmith et al. |
| 7,433,891 B2 | 10/2008 | Haber et al. |
| 7,444,302 B2 | 10/2008 | Hu et al. |
| 7,472,088 B2 | 12/2008 | Taylor et al. |
| RE40,692 E | 3/2009 | Rose, Jr. |
| 7,505,838 B2 | 3/2009 | Raines et al. |
| 7,561,963 B2 | 7/2009 | Brice et al. |
| 7,567,922 B1 | 7/2009 | Weinberg et al. |
| 7,571,139 B1 | 8/2009 | Giordano et al. |
| 7,580,856 B1 | 8/2009 | Pliha |
| 7,590,589 B2 | 9/2009 | Hoffberg |
| 7,593,893 B1 | 9/2009 | Ladd et al. |
| 7,596,512 B1 | 9/2009 | Raines et al. |
| 7,603,293 B2 | 10/2009 | Chenn |
| 7,610,257 B1 | 10/2009 | Abrahams |
| 7,630,932 B2 | 12/2009 | Danaher et al. |
| 7,653,592 B1 | 1/2010 | Flaxman et al. |
| 7,693,896 B1 | 4/2010 | Raines |
| 7,739,142 B2 | 6/2010 | Chand et al. |
| 7,778,841 B1 | 8/2010 | Bayer et al. |
| 7,788,147 B2 | 8/2010 | Haggerty et al. |
| 7,835,940 B2 | 11/2010 | Kowalchuk |
| 7,865,409 B1 | 1/2011 | Monaghan |
| 7,877,320 B1 | 1/2011 | Downey |
| 7,925,654 B1 | 4/2011 | Raines |
| 7,945,478 B2 | 5/2011 | Hogan et al. |
| 7,945,483 B2 | 5/2011 | Inghelbrecht et al. |
| 7,962,404 B1 | 6/2011 | Metzger, II et al. |
| 7,966,210 B2 | 6/2011 | Hall et al. |
| 7,974,886 B2 | 7/2011 | Coleman |
| 7,991,689 B1 | 8/2011 | Brunzell et al. |
| 8,005,759 B2 | 8/2011 | Hirtenstein et al. |
| 8,005,795 B2 | 8/2011 | Galipeau et al. |
| 8,036,952 B2 | 10/2011 | Mohr et al. |
| 8,055,544 B2 | 11/2011 | Ullman et al. |
| 8,078,524 B2 | 12/2011 | Crawford et al. |
| 8,104,671 B2 | 1/2012 | Besecker et al. |
| 8,121,938 B1 | 2/2012 | Zettner et al. |
| 8,185,417 B1 | 5/2012 | Brown et al. |
| 8,219,464 B2 | 7/2012 | Inghelbrecht et al. |
| 8,239,388 B2 | 8/2012 | Raines |
| 8,244,563 B2 | 8/2012 | Coon et al. |
| 8,255,243 B2 | 8/2012 | Raines et al. |
| 8,255,244 B2 | 8/2012 | Raines et al. |
| 8,285,656 B1 | 10/2012 | Chang et al. |
| 8,355,983 B1 | 1/2013 | Parr et al. |
| 8,380,594 B2 | 2/2013 | Berkman et al. |
| 8,392,334 B2 | 3/2013 | Hirtenstein et al. |
| 8,438,048 B1 | 5/2013 | Benavides, III |
| 8,438,170 B2 | 5/2013 | Koran et al. |
| 8,521,615 B2 | 8/2013 | Inghelbrecht et al. |
| 8,560,161 B1 | 10/2013 | Kator et al. |
| 8,577,736 B2 | 11/2013 | Swinson et al. |
| 8,595,079 B1 | 11/2013 | Raines et al. |
| 8,600,783 B2 | 12/2013 | Smith et al. |
| 8,600,823 B1 | 12/2013 | Raines et al. |
| 8,606,648 B1 | 12/2013 | Bayer et al. |
| 8,626,560 B1 | 1/2014 | Anderson |
| 8,630,929 B2 | 1/2014 | Haggerty et al. |
| 8,645,193 B2 | 2/2014 | Swinson et al. |
| 8,661,032 B2 | 2/2014 | Otten et al. |
| 8,725,584 B1 | 5/2014 | Eager et al. |
| 8,762,191 B2 | 6/2014 | Lawrence et al. |
| 8,781,846 B2 | 7/2014 | Swinson et al. |
| 9,020,843 B2 | 4/2015 | Taira et al. |
| 9,020,844 B2 | 4/2015 | Taira et al. |

(56) References Cited

U.S. PATENT DOCUMENTS

| | | |
|---|---|---|
| 9,053,589 B1 | 6/2015 | Kator et al. |
| 9,053,590 B1 | 6/2015 | Kator et al. |
| 9,076,276 B1 | 7/2015 | Kator et al. |
| 9,087,335 B2 | 7/2015 | Rane et al. |
| 9,105,048 B2 | 8/2015 | Koran et al. |
| 9,111,308 B2 | 8/2015 | Taira et al. |
| 9,123,056 B2 | 9/2015 | Singh et al. |
| 9,129,325 B2 | 9/2015 | Taira et al. |
| 9,147,217 B1 | 9/2015 | Zabritski et al. |
| 9,292,860 B2 | 3/2016 | Singh et al. |
| 9,501,781 B2 | 11/2016 | Singh et al. |
| 9,646,308 B1 | 5/2017 | Eager et al. |
| 9,690,820 B1 | 6/2017 | Girulat, Jr. |
| 9,697,544 B1 | 7/2017 | Bayer et al. |
| 9,727,904 B2 | 8/2017 | Inghelbrecht et al. |
| 9,741,066 B2 | 8/2017 | Eager et al. |
| 9,754,304 B2 | 9/2017 | Taira et al. |
| 9,818,140 B2 | 11/2017 | Inghelbrecht et al. |
| 9,904,933 B2 | 2/2018 | Taira et al. |
| 9,904,948 B2 | 2/2018 | Taira et al. |
| 10,009,432 B1 | 6/2018 | Tang et al. |
| 10,162,848 B2 * | 12/2018 | Mohan ................ G06F 16/215 |
| 10,163,156 B1 | 12/2018 | Shapley et al. |
| 10,217,123 B2 | 2/2019 | Taira et al. |
| 10,269,030 B2 | 4/2019 | Taira et al. |
| 10,269,031 B2 | 4/2019 | Inghelbrecht et al. |
| 10,380,654 B2 | 8/2019 | Hirtenstein et al. |
| 10,409,867 B1 | 9/2019 | Von Busch et al. |
| 10,430,848 B2 | 10/2019 | Cotton et al. |
| 10,489,809 B2 | 11/2019 | Inghelbrecht et al. |
| 10,489,810 B2 | 11/2019 | Taira et al. |
| 10,515,382 B2 | 12/2019 | Taira et al. |
| 10,565,181 B1 | 2/2020 | Hjermstad et al. |
| 10,580,054 B2 | 3/2020 | Cain et al. |
| 10,581,825 B2 | 3/2020 | Poschel et al. |
| 10,740,404 B1 | 8/2020 | Hjermstad et al. |
| 10,853,831 B2 | 12/2020 | Inghelbrecht et al. |
| 10,977,727 B1 | 4/2021 | Smith et al. |
| 11,017,427 B1 | 5/2021 | Badger et al. |
| 11,157,835 B1 | 10/2021 | Hjermstad et al. |
| 11,176,608 B1 | 11/2021 | Smith |
| 11,210,276 B1 | 12/2021 | Smith |
| 11,210,351 B1 | 12/2021 | Von Busch et al. |
| 11,257,126 B2 | 2/2022 | Hirtenstein et al. |
| 11,301,922 B2 | 4/2022 | Smith |
| 11,366,860 B1 | 6/2022 | Hjermstad et al. |
| 11,481,827 B1 | 10/2022 | Cain et al. |
| 11,532,030 B1 | 12/2022 | Smith |
| 11,568,005 B1 | 1/2023 | Von Busch et al. |
| 11,587,163 B1 | 2/2023 | Smith |
| 11,640,433 B1 | 5/2023 | Hjermstad et al. |
| 11,790,269 B1 | 10/2023 | Hjermstad et al. |
| 11,836,785 B1 | 12/2023 | Smith |
| 11,886,519 B1 | 1/2024 | Von Busch et al. |
| 12,020,294 B2 | 6/2024 | Hirtenstein et al. |
| 2001/0044769 A1 | 11/2001 | Chaves |
| 2002/0023051 A1 | 2/2002 | Kunzle et al. |
| 2002/0042752 A1 | 4/2002 | Chaves |
| 2002/0072964 A1 | 6/2002 | Choi |
| 2002/0082978 A1 | 6/2002 | Ghouri et al. |
| 2002/0091706 A1 | 7/2002 | Anderson et al. |
| 2002/0099628 A1 | 7/2002 | Takaoka et al. |
| 2002/0103622 A1 | 8/2002 | Burge |
| 2002/0128960 A1 | 9/2002 | Lambiotte et al. |
| 2002/0161496 A1 | 10/2002 | Yamaki |
| 2002/0193925 A1 | 12/2002 | Funkhouser et al. |
| 2003/0033242 A1 | 2/2003 | Lynch et al. |
| 2003/0041019 A1 | 2/2003 | Vagim, III et al. |
| 2003/0046179 A1 | 3/2003 | Anabtawi et al. |
| 2003/0101111 A1 | 5/2003 | Dang et al. |
| 2003/0105728 A1 | 6/2003 | Yano et al. |
| 2003/0144950 A1 | 7/2003 | O'Brien et al. |
| 2003/0177481 A1 * | 9/2003 | Amaru ................ G06F 16/25 717/148 |
| 2003/0187753 A1 | 10/2003 | Takaoka |
| 2003/0200151 A1 | 10/2003 | Ellenson et al. |
| 2003/0216965 A1 | 11/2003 | Libman |
| 2003/0233323 A1 | 12/2003 | Bilski et al. |
| 2004/0034657 A1 | 2/2004 | Zambo et al. |
| 2004/0039646 A1 | 2/2004 | Hacker |
| 2004/0088228 A1 | 5/2004 | Mercer et al. |
| 2004/0093286 A1 | 5/2004 | Cooper et al. |
| 2004/0107125 A1 | 6/2004 | Guheen et al. |
| 2004/0128262 A1 | 7/2004 | Nafousi |
| 2004/0163101 A1 | 8/2004 | Swix |
| 2004/0193644 A1 * | 9/2004 | Baker ................ G06F 16/2425 |
| 2004/0243506 A1 | 12/2004 | Das |
| 2004/0249532 A1 | 12/2004 | Kelly et al. |
| 2005/0010555 A1 | 1/2005 | Gallivan |
| 2005/0021384 A1 | 1/2005 | Pantaleo et al. |
| 2005/0038580 A1 | 2/2005 | Seim et al. |
| 2005/0113991 A1 | 5/2005 | Rogers et al. |
| 2005/0173524 A1 | 8/2005 | Schrader |
| 2005/0177489 A1 | 8/2005 | Neff et al. |
| 2005/0209892 A1 | 9/2005 | Miller |
| 2005/0234912 A1 | 10/2005 | Roach |
| 2005/0246256 A1 | 11/2005 | Gastineau et al. |
| 2005/0251820 A1 | 11/2005 | Stefanik et al. |
| 2005/0256780 A1 | 11/2005 | Eldred |
| 2005/0267754 A1 | 12/2005 | Schultz et al. |
| 2005/0267774 A1 | 12/2005 | Merritt et al. |
| 2006/0004731 A1 | 1/2006 | Seibel et al. |
| 2006/0010052 A1 | 1/2006 | Willingham |
| 2006/0015425 A1 | 1/2006 | Brooks |
| 2006/0031182 A1 | 2/2006 | Ryan et al. |
| 2006/0041443 A1 | 2/2006 | Horvath |
| 2006/0107560 A1 | 5/2006 | Wong |
| 2006/0149674 A1 | 7/2006 | Cook et al. |
| 2006/0163868 A1 | 7/2006 | Baumann |
| 2006/0178957 A1 | 8/2006 | LeClaire |
| 2006/0178973 A1 | 8/2006 | Chiovari et al. |
| 2006/0202012 A1 | 9/2006 | Grano et al. |
| 2006/0202862 A1 | 9/2006 | Ratnakar |
| 2006/0206416 A1 | 9/2006 | Farias |
| 2006/0218079 A1 | 9/2006 | Goldblatt et al. |
| 2006/0229799 A1 | 10/2006 | Nimmo et al. |
| 2006/0242046 A1 | 10/2006 | Haggerty et al. |
| 2006/0242050 A1 | 10/2006 | Haggerty et al. |
| 2006/0277141 A1 | 12/2006 | Palmer |
| 2007/0011083 A1 | 1/2007 | Bird et al. |
| 2007/0027791 A1 | 2/2007 | Young et al. |
| 2007/0043487 A1 | 2/2007 | Krzystofczyk et al. |
| 2007/0059442 A1 | 3/2007 | Sabeta |
| 2007/0136163 A1 | 6/2007 | Bell |
| 2007/0156515 A1 | 7/2007 | Hasselback et al. |
| 2007/0162293 A1 | 7/2007 | Malkon |
| 2007/0173993 A1 | 7/2007 | Nielsen et al. |
| 2007/0179798 A1 | 8/2007 | Inbarajan |
| 2007/0179860 A1 | 8/2007 | Romero |
| 2007/0185777 A1 | 8/2007 | Pyle et al. |
| 2007/0192165 A1 | 8/2007 | Haggerty et al. |
| 2007/0226131 A1 | 9/2007 | Decker et al. |
| 2007/0244732 A1 | 10/2007 | Chatterji et al. |
| 2007/0250327 A1 | 10/2007 | Hedy |
| 2007/0271178 A1 | 11/2007 | Davis et al. |
| 2007/0282713 A1 | 12/2007 | Ullman et al. |
| 2007/0288271 A1 | 12/2007 | Klinkhammer |
| 2007/0294163 A1 | 12/2007 | Harmon et al. |
| 2008/0015954 A1 | 1/2008 | Huber et al. |
| 2008/0016119 A1 | 1/2008 | Sharma et al. |
| 2008/0059317 A1 | 3/2008 | Chandran et al. |
| 2008/0071882 A1 | 3/2008 | Hering et al. |
| 2008/0097663 A1 | 4/2008 | Morimoto |
| 2008/0120155 A1 | 5/2008 | Pliha |
| 2008/0126137 A1 | 5/2008 | Kidd et al. |
| 2008/0177590 A1 | 7/2008 | Brodsky et al. |
| 2008/0183689 A1 | 7/2008 | Kubota et al. |
| 2008/0183722 A1 | 7/2008 | Lane et al. |
| 2008/0201163 A1 | 8/2008 | Barker et al. |
| 2008/0228635 A1 | 9/2008 | Megdal et al. |
| 2008/0235061 A1 | 9/2008 | Innes |
| 2008/0255897 A1 | 10/2008 | Megdal et al. |
| 2008/0294540 A1 | 11/2008 | Celka et al. |
| 2008/0294546 A1 | 11/2008 | Flannery |

(56) References Cited

U.S. PATENT DOCUMENTS

| | | |
|---|---|---|
| 2008/0301188 A1 | 12/2008 | O'Hara |
| 2008/0312969 A1 | 12/2008 | Raines et al. |
| 2009/0018996 A1 | 1/2009 | Hunt et al. |
| 2009/0055044 A1 | 2/2009 | Dienst |
| 2009/0063172 A1 | 3/2009 | Thomas et al. |
| 2009/0083130 A1 | 3/2009 | Hall et al. |
| 2009/0138290 A1 | 5/2009 | Holden |
| 2009/0144201 A1 | 6/2009 | Gierkink et al. |
| 2009/0187513 A1 | 7/2009 | Noy et al. |
| 2009/0240602 A1 | 9/2009 | Mohr et al. |
| 2009/0240735 A1 | 9/2009 | Grandhi et al. |
| 2009/0254856 A1 | 10/2009 | Cwajbaum |
| 2009/0271296 A1 | 10/2009 | Romero |
| 2009/0271385 A1 | 10/2009 | Krishnamoorthy et al. |
| 2009/0287370 A1 | 11/2009 | Iwai et al. |
| 2010/0030649 A1 | 2/2010 | Ubelhor |
| 2010/0049538 A1 | 2/2010 | Frazer et al. |
| 2010/0070343 A1 | 3/2010 | Taira et al. |
| 2010/0070382 A1 | 3/2010 | Inghelbrecht et al. |
| 2010/0076881 A1 | 3/2010 | O'Grady et al. |
| 2010/0082792 A1 | 4/2010 | Johnson |
| 2010/0088158 A1 | 4/2010 | Pollack |
| 2010/0094664 A1 | 4/2010 | Bush et al. |
| 2010/0153235 A1 | 6/2010 | Mohr et al. |
| 2010/0161486 A1 | 6/2010 | Liu et al. |
| 2010/0174657 A1 | 7/2010 | Stanton, Jr. |
| 2010/0179861 A1 | 7/2010 | Teerilahti et al. |
| 2010/0198629 A1 | 8/2010 | Wesileder et al. |
| 2010/0217616 A1 | 8/2010 | Colson et al. |
| 2010/0223106 A1 | 9/2010 | Hallowell et al. |
| 2010/0293089 A1 | 11/2010 | Peterson et al. |
| 2010/0293181 A1 | 11/2010 | Muller et al. |
| 2010/0299190 A1 | 11/2010 | Pratt et al. |
| 2010/0332292 A1 | 12/2010 | Anderson |
| 2011/0022489 A1 | 1/2011 | Hallowell et al. |
| 2011/0022525 A1 | 1/2011 | Swinson et al. |
| 2011/0040440 A1 | 2/2011 | de Oliveira et al. |
| 2011/0082759 A1 | 4/2011 | Swinson et al. |
| 2011/0137758 A1 | 6/2011 | Bienias |
| 2011/0161115 A1 | 6/2011 | Hampton |
| 2011/0202471 A1 | 8/2011 | Scott et al. |
| 2011/0213641 A1 | 9/2011 | Metzger, II et al. |
| 2011/0264595 A1 | 10/2011 | Anspach et al. |
| 2011/0270706 A1 | 11/2011 | Anspach et al. |
| 2011/0270707 A1 | 11/2011 | Breed et al. |
| 2011/0276467 A1 | 11/2011 | Blackburn et al. |
| 2011/0320241 A1 | 12/2011 | Miller |
| 2012/0005045 A1 | 1/2012 | Baker |
| 2012/0005070 A1 | 1/2012 | McFall et al. |
| 2012/0005108 A1 | 1/2012 | Hollenshead et al. |
| 2012/0106801 A1 | 5/2012 | Jackson |
| 2012/0109770 A1* | 5/2012 | Seergy ............... G06Q 30/0627 |
| | | 705/26.2 |
| 2012/0197699 A1* | 8/2012 | Snell .................. G06Q 30/08 |
| | | 705/26.3 |
| 2012/0221485 A1 | 8/2012 | Leidner et al. |
| 2012/0239637 A9 | 9/2012 | Prakash et al. |
| 2012/0254017 A1 | 10/2012 | Fusco et al. |
| 2012/0265648 A1 | 10/2012 | Jerome et al. |
| 2012/0271850 A1* | 10/2012 | Licata Messana ..... G06Q 10/08 |
| | | 707/779 |
| 2012/0331010 A1* | 12/2012 | Christie ................ G06F 16/27 |
| | | 707/802 |
| 2013/0006801 A1 | 1/2013 | Solari et al. |
| 2013/0006809 A1 | 1/2013 | Hollenshead et al. |
| 2013/0159033 A1* | 6/2013 | Weinstock ............ G06Q 50/40 |
| | | 705/5 |
| 2013/0173453 A1 | 7/2013 | Raines et al. |
| 2013/0173481 A1 | 7/2013 | Hirtenstein et al. |
| 2013/0238455 A1* | 9/2013 | Laracey ............... G06Q 20/102 |
| | | 705/21 |
| 2013/0268298 A1 | 10/2013 | Elkins et al. |
| 2014/0025681 A1 | 1/2014 | Raines |
| 2014/0058956 A1 | 2/2014 | Raines et al. |
| 2014/0082017 A1 | 3/2014 | Miller |
| 2014/0258309 A1* | 9/2014 | Young ............... G06F 16/24578 |
| | | 707/748 |
| 2014/0278402 A1 | 9/2014 | Charugundla |
| 2014/0279868 A1 | 9/2014 | Astorg et al. |
| 2014/0358719 A1 | 12/2014 | Inghelbrect et al. |
| 2015/0154608 A9 | 6/2015 | Raines |
| 2015/0213559 A1 | 7/2015 | Raines et al. |
| 2015/0227942 A1 | 8/2015 | Sidman et al. |
| 2015/0310865 A1 | 10/2015 | Fay et al. |
| 2015/0317728 A1 | 11/2015 | Nguyen |
| 2015/0324400 A1 | 11/2015 | Sheck et al. |
| 2015/0332411 A1 | 11/2015 | Bush et al. |
| 2015/0348143 A1 | 12/2015 | Raines et al. |
| 2015/0348145 A1 | 12/2015 | Nakajima |
| 2016/0004742 A1 | 1/2016 | Mohan et al. |
| 2016/0012494 A1* | 1/2016 | Lasini ................... G06Q 40/08 |
| | | 705/306 |
| 2016/0048698 A1 | 2/2016 | Sahu et al. |
| 2016/0104222 A1 | 4/2016 | Savir et al. |
| 2016/0180428 A1 | 6/2016 | Cain et al. |
| 2016/0217046 A1* | 7/2016 | Lamoureux ............ G06Q 10/02 |
| 2016/0267588 A1 | 9/2016 | Cain et al. |
| 2016/0299905 A1 | 10/2016 | Geyer et al. |
| 2016/0321726 A1* | 11/2016 | Singh .................... G06Q 40/03 |
| 2016/0379486 A1 | 12/2016 | Taylor |
| 2017/0052652 A1 | 2/2017 | Denton et al. |
| 2017/0270490 A1 | 9/2017 | Penilla et al. |
| 2017/0323295 A1* | 11/2017 | Kranzley ............ G06Q 30/0611 |
| 2018/0018723 A1* | 1/2018 | Nagla ................... H04L 63/102 |
| 2018/0107676 A1* | 4/2018 | Vora ....................... G06F 16/168 |
| 2018/0108189 A1* | 4/2018 | Park ........................ H04L 67/12 |
| 2018/0157761 A1 | 6/2018 | Halstead et al. |
| 2018/0165747 A1* | 6/2018 | Patten ................ G06Q 30/0603 |
| 2018/0260838 A1 | 9/2018 | New et al. |
| 2018/0349988 A1 | 12/2018 | Shebesta et al. |
| 2019/0295133 A1 | 9/2019 | Hirtenstein et al. |
| 2020/0051102 A1 | 2/2020 | Taira et al. |
| 2020/0065885 A1 | 2/2020 | Smith |
| 2020/0065898 A1 | 2/2020 | Forrester et al. |
| 2020/0265480 A1 | 8/2020 | Swinson et al. |
| 2022/0198527 A1 | 6/2022 | Hirtenstein et al. |

FOREIGN PATENT DOCUMENTS

| | | |
|---|---|---|
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| JP | 2004-245897 | 9/2004 |
| JP | 2007-299281 | 11/2007 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2002-0068866 | 8/2002 |
| KR | 10-2014-0020388 | 2/2014 |
| NZ | 503219 | 8/2003 |
| WO | WO 99/004350 | 1/1999 |
| WO | WO 99/022328 | 5/1999 |
| WO | WO 01/071458 | 9/2001 |
| WO | WO 01/075754 | 10/2001 |
| WO | WO 03/101123 | 12/2003 |
| WO | WO 2007/149941 | 12/2007 |
| WO | WO 2008/022289 | 2/2008 |
| WO | WO 2018/199992 | 11/2018 |

OTHER PUBLICATIONS

"AutoConnect Partners with Organic to Build World's Most Comprehensive Online Emporium of Pre-Owned Vehicles", PR Newswire, May 19, 1998, pp. 2.

(56) References Cited

OTHER PUBLICATIONS

"Auto Market Statistics[SM]:Drive Response with Aggregated Motor Vehicle Information", Experian, Apr. 2007, http://www.experian.com/assets/marketing-services/product-sheets/auto-market-statistics.pdf, pp. 2.
"Appraisal Tool", VAuto Live Market View, Dec. 14, 2007, http://www.vauto.com/vAuto_solution/appraisal.asp, pp. 3.
Autobytel.com, http://web.archive.org/web/20040806010507//http://autobytel.com/, as archived Aug. 6, 2004, pp. 3.
Bala, Pradip Kumar, "Purchase-Driven Classification for Improved Forecasting in Spare Parts Inventory Replenishment," International Journal of Computer Applications, Nov. 2010, vol. 10, No. 9, pp. 40-45.
Bankrate.com, http://web.archive.org/web/20040809000026/www.bankrate.com/brm/default.asp, as archived Aug. 9, 2004, pp. 3.
"Carfax Teams with Esurance", PR Newswire, May 14, 2001, p. 1.
Cars.com, http://web.archive.org/web/20041010081241/www.cars.com/go/index.jsp?aff=national, as archived Oct. 10, 2004, pp. 2.
Carsdirect.com, http://web.archive.org/web/20040730142836/www.carsdirect.com/home, as archived Jul. 30, 2004, pp. 2.
Checkbook.org, http://web.archive.org/web/20040604192834/www.checkbook.org/auto/carbarg.cfm, as archived Jun. 4, 2004, p. 1.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003, pp. 2.
Cohen et al., "Optimizer: IBM's Multi Echelon Inventory System for Managing Service Logistics", Interfaces, vol. 20, No. 1, Jan.-Feb. 1990, pp. 65-82.
Copeland et al., "Wallet-on-Wheels—Using Vehicle's Identity for Secure Mobile Money", 17th International Conference on Intelligence in Next Generation Networks, 2013, pp. 102-109.
"Driveitaway.com Links with AutoCheck to Provide Car Shoppers Vehicle Histories; Consumers Bidding on Driveitaway.com's Used Auto Auctions Can Now Go Online to Research a Specific Vehicle's History", PR Newswire, Jan. 15, 2001, p. 1.
"Experian Uses SSA-NAME3 to Match 40 to 50 Million Transactions per Month Against an 11.5 Billion Row Database", DM Review, Apr. 2001, vol. 11, No. 4, pp. 3.
Farrell et al., "Installed Base and Compatibility: Innovation, Product Preannouncements, and Predation", The American Economic Review, Dec. 1986, vol. 76, No. 5, pp. 940-955.
Garcia-Molina et al., "Database Systems: The Complete Book", Prentice Hall, Inc., Ch. 15, Oct. 1, 2001, pp. 713-715.
Grange, Frank, "Challenges in Modeling Demand for Inventory Optimization of Slow-Moving Items," Proceedings of the 1998 Winter Simulation Conference, 1998, pp. 1211-1217.
Greenlight.com Teams up With Credit Online to Expand Online Financing Options, Published in PR Newswire Association LLC; New York; Aug. 28, 2000 extracted from Dialog on Jun. 14, 2021, pp. 3.
Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.
Handfield et al., "Managing Component Life Cycles in Dynamic Technological Environments", International Journal of Purchasing and Materials Management, Tempe, Spring 1994, vol. 30, No. 2, pp. 20-28.
Inderfurth et al., "Decision Support for Spare Parts Acquisition in Post Product Life Cycle", Central European Journal of Operations Research, 2008, vol. 16, pp. 17-42.
"Intelligence Insight Impact", Polk Automotive Manufacturers; http://usa.polk.com/Industries/AutoMfr/Analyze/MarketAnalysis/, Dec. 13, 2007, pp. 3.
International Search Report and Written Opinion in PCT Application No. PCT/US07/76152, dated Mar. 20, 2009.
Invoicedealers.com, http://web.archive.org/web/20040804044511/http://www.invoicedealers.com/, Aug. 4, 2004, pp. 2.
Ivillage.com, http://web.archive.org/web/20040729234947/http://www.ivillage.com/, Jul. 29, 2004, pp. 2.
"Japan's JAAI System Appraises Used Cars Over Internet", Asia Pulse, Mar. 3, 2000, p. 1.
Jaro, Matthew A., "Probabilistic Linkage of Large Public Health Data Files", Statistics in Medicine, 1995, vol. 14, pp. 491-498.
Käki, Anssi, "Forecasting in End-Of-Life Spare Parts Procurement", Master's Thesis, Helsinki University of Technology, System Analysis Laboratory, Jul. 27, 2007, pp. 84.
Kennedy et al., "An Overview of Recent Literature on Spare Parts Inventories", International Journal of Production Economics, 2002, vol. 76, pp. 201-215.
Kim et al., "Optimal Pricing, EOL (End of Life) Warranty, and Spare Parts Manufacturing Strategy Amid Product Transition", European Journal of Operation Research, 2008, vol. 188, pp. 723-745.
Koller, Mike, "Wireless Service Aids," InternetWeek, Jul. 9, 2001, p. 15.
Krupp, James A.G., "Forecasting for the Automotive Aftermarket", The Journal of Business Forecasting Methods & Systems, Winter 1993-1994, vol. 12, No. 4, ABI/Inform Global, pp. 8-12.
Lapide, Larry, "New Developments in Business Forecasting", The Journal of Business Forecasting, Spring 2002, pp. 12-14.
Lee, Ho Geun, "AUCNET: Electronic Intermediary for Used-Car Transactions", EM—Electronic Markets, Dec. 1997, vol. 7, No. 4, pp. 24-28.
Miller, Joe, "NADA Used-Car Prices Go Online", Automotive News, Jun. 14, 1999, p. 36.
Moore, John R., Jr. "Forecasting and Scheduling for Past-Model Replacement Parts", Management Science, Application Series, vol. 18, No. 4, Part 1, Dec. 1971, pp. B-200-B-213.
"NAAA-Recommended Vehicle Condition Grading Scale", Noted as early as 2007, pp. 3.
Packer, A. H., "Simulation and Adaptive Forecasting an Applied to Inventory Control", Operations Research, Jul. 1965, vol. 15, No. 4, pp. 660-679.
"Power Information Network: Power to Drive your Business", J.D. Power and Associates Power Information Network, http://www.powerinfonet.com/products/productDetail.asp?type=financialinstitutions, Dec. 13, 2007, pp. 2.
Peters, Peter-Paul, "A Spare Parts Configurator for the European Service Business" (Graduation Report), Honeywell, Industrial Service Logistic Center, Amsterdam, The Netherlands, Mar. 2000, pp. 80.
Porter, G. Zell, "An Economic Method for Evaluating Electronic Component Obsolescence Solutions", www.gidep.org/data/dmsms/library/zell.pdf, May 1998, pp. 1-9.
"Pricing Tool", vAuto Live Market View, http://www.vauto.com/vAuto_Solution/pricing.asp, Dec. 13, 2007, pp. 2.
Reinbach, Andrew, "MCIF Aids Banks in CRA Compliance", Bank Systems & Technology, Aug. 1995, vol. 32, No. 8, p. 27.
Roos, Gina, "Web-Based Service Helps OEMs Cure Parts Obsolescence Blues", Electronic Engineering Times, Oct. 8, 2001, p. 86.
Santarini, Michael, "Forecasts the Probable Obsolescence of Components—Module Predicts Parts Life", Electronic Engineering Times, Jan. 11, 1999, vol. 1, p. 48.
Sawyers, Arlena, "NADA to Offer Residual Guide", Automotive News, May 22, 2000, p. 1.
Shapiro et al., "Systems Competition and Aftermarkets: an Economic Analysis of Kodak", The Antitrust Bulletin, Spring 1994, pp. 135-162.
"Stoneage Corporation Announces Database of 250,000 Used Cars Posted to the Internet", PR Newswire, Feb. 24, 1998, p. 1.
Sullivan, Laurie, "Obsolete—Parts Program Thriving", EBN, Manhasset, NY, Jan. 21, 2002, Issue 1296, p. 26.
"The Most Reliable Cars 2006", https://www.forbes.com/2006/04/20/reliable-vehicles-japanese_cx_dl_0424feat%20html?sh=19b3172a48f3, Apr. 24, 2006, pp. 4.
"Urban Science Launches Second Generation Lead Scoring Solution", Urban Science, Detroit, MI, Mar. 1, 2007, http://www.urbanscience.com/newsevents/pr_20070222.html, pp. 3.

(56) References Cited

OTHER PUBLICATIONS

"WashingtonPost.com and Cars.com Launch Comprehensive Automotive Web Site for the Washington Area", PR Newswire, Oct. 22, 1998. pp. 2.

Watts, Craig, "Consumers Now Can Know What Loan Rate Offers to Expect Based on Their FICO Credit Score at MyFICO.com," San Rafael, CA, Mar. 6, 2002, pp. 2, http://www.myfico.com/PressRoom/PressReleases/2002_03_06.aspx.

Webster, Lee R., "Failure Rates & Life-Cycle Costs", Consulting-Specifying Engineer, Apr. 1998, vol. 23, No. 4, ABI/INFORM Global, p. 42.

"Web Sites Let Automotive Consumers Arm Themselves with Price Information", Orange County Register, Nov. 14, 1997, pp. 3.

"Yahoo! Autos Provides Enhanced Road Map for Researching, Buying and Selling Cars Online", PR Newswire, Oct. 13, 1998, pp. 2.

\* cited by examiner

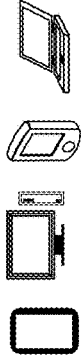
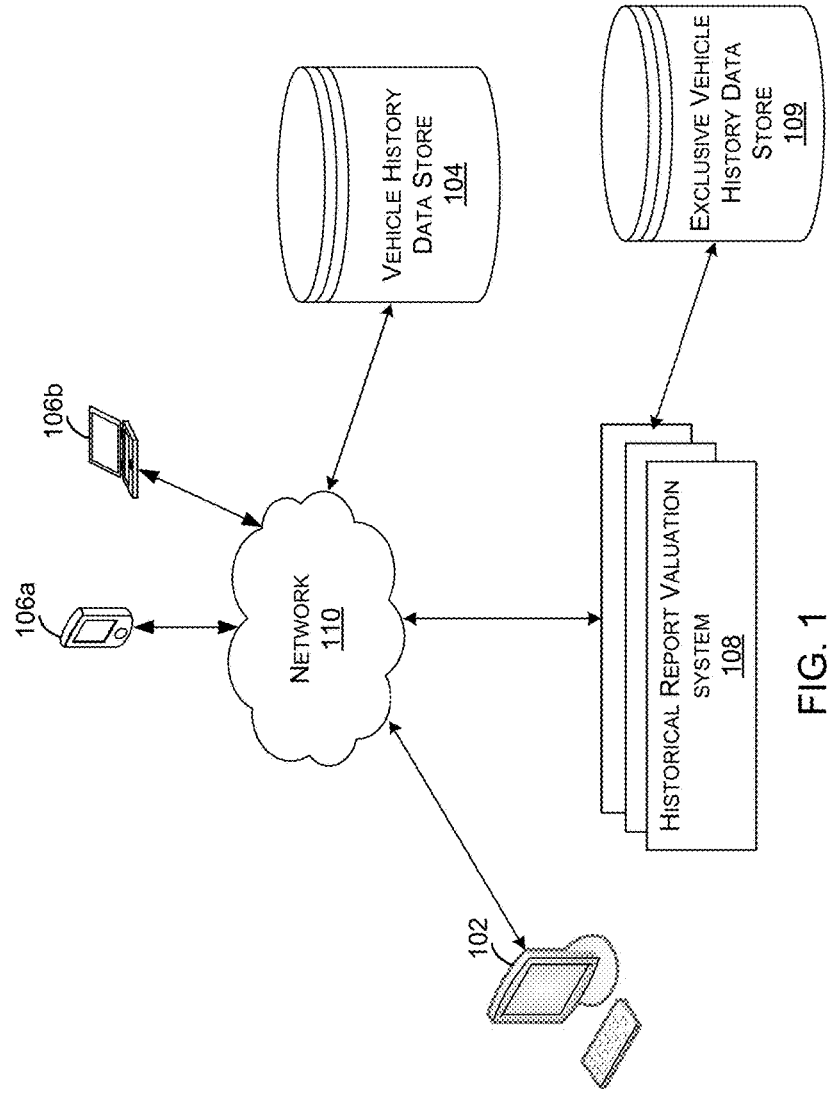
FIG. 1

Sample Dealership Lift Report
LIFT REPORT

File Statistics
- 902a — 331
- 902b — 328
- 902c — 314
- 902d — 121
- 902e — 38.54%

| Metric | Shared Sources | AutoCheck Sources |
|---|---|---|
| Reported Issues | | |
| Collision related events (brands or other problems) | 10 | 16 |
| Auto insurance source reported events | 2 | 2 |
| Exclusive auction announced data | | 4 |
| Total VINs with reported issues | 12 | 16 |
| Percentage of VINs with records or negative events with reported iss | 3.82% | 5.10% |
| Exclusive data lift (reported issues) | | 1.27% |
| Accidents and Damage Related Events | | |
| Total accidents and damage related events | 96 | 116 |
| Exclusive accidents and damage related events | | 20 |
| Percentage of VINs with records with accidents and damage related | 30.57% | 36.94% |
| Exclusive data lift (New Accidents) | | 6.37% |
| Total Exclusive Events | | |
| Exclusive auction announced data | | 4 |
| Exclusive accident events | | 20 |
| Total exclusive data events | | 24 |
| Percentage of VINs with records that have exclusive data | | 7.64% |

FIG. 9

SYSTEMS AND METHODS OF MANAGING A DATABASE OF ALPHANUMERIC VALUES

CROSS-REFERENCE TO RELATED APPLICATIONS

This Application is a continuation of U.S. application Ser. No. 18/066,198, entitled "SYSTEMS AND METHODS OF MANAGING A DATABASE OF ALPHANUMERIC VALUES" filed Dec. 14, 2022, which is a continuation of U.S. application Ser. No. 17/455,368, entitled "SYSTEMS AND METHODS OF MAINTAINING A DATABASE OF ALPHANUMERIC VALUES" filed Nov. 17, 2021, now issued as U.S. Pat. No. 11,568,005, which is a continuation of U.S. application Ser. No. 16/521,414, entitled "SYSTEMS AND METHODS OF MAINTAINING A DATABASE OF ALPHANUMERIC VALUES" filed Jul. 24, 2019, now issued as U.S. Pat. No. 11,210,351, which is a continuation of U.S. application Ser. No. 15/624,609, entitled "SYSTEMS AND METHODS OF MAINTAINING A DATABASE OF ALPHANUMERIC VALUES" filed Jun. 15, 2017, now issued as U.S. Pat. No. 10,409,867, which claims priority benefit to Provisional Application No. 62/351,241 entitled "SYSTEMS AND METHODS OF IDENTIFYING AND APPLYING VALUE FROM HISTORICAL CONSIDERATIONS" filed Jun. 16, 2016, the disclosure of each of which is hereby expressly incorporated in its entirety by reference herein.

BACKGROUND

This application relates to providing information in an alphanumeric format for processing. The information may be stored in a database used to aggregate information from an entity or a plurality of entities for processing by a data processing system. Based on the information in the database, a plurality of other databases may be searched for records and the records from the plurality of other databases may be compared. In some embodiments, the information provided to the database may relate to inventories. By comparing records from the plurality of other databases, information that is only available in one of the databases may be identified. Accordingly, systems and methods of receiving information for storage in a database and comparison of records for that information from a plurality of other databases are desired.

SUMMARY

Various implementations of methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described herein comprises a system for identifying and analyzing database records. The system comprises a communication circuit, an interface, and a processor. The communication circuit is configured to transmit and receive information over a communication network. The interface is configured to allow user operation and interaction via the communication network. The processor is configured to provide data to and receive data from the interface and receive, via the interface, a first list of records. The list of records comprises one or more alphanumeric records, wherein at least one unique identifier exists for each alphanumeric record. The processor is also configured to generate a second list of records comprising one or more alphanumeric records based on validating each of the alphanumeric records of the first list, wherein only validated alphanumeric records of the first list are included in the second list. For each alphanumeric record in the second list, the processor is configured to request one or more database records from one or more databases via the communication network based on the unique identifier, wherein each obtained database record includes a history of events associated with the unique identifier. The processor is further configured to identify, based on the obtained database records, a number of alphanumeric records in the second list having events in their respective histories that were obtained from an exclusive database of the one or more databases, wherein the exclusive database provides database records to only select users. The processor is also further configured to determine a percentage of alphanumeric records in the second list having negative events in their respective histories as compared to a total number of alphanumeric records for which any database record was returned from the one or more databases. The processor is further also configured to generate a report including the determined percentage and convey the report to the user via the communication circuit.

Another aspect of the subject matter described herein comprises a method of identifying and analyzing database records. The method comprises receiving, via an interface, a first list of records. The first list comprises one or more alphanumeric records, wherein at least one unique identifier exists for each alphanumeric record. The method further comprises generating a second list of records comprising one or more alphanumeric records based on validating each of the alphanumeric records of the first list, wherein only validated alphanumeric records of the first list are included in the second list. The method also comprises storing the second list of records in a database. For each alphanumeric record in the second list, the method comprises requesting one or more database records from one or more databases via a communication network based on the unique identifier, wherein each obtained database record includes a history of events associated with the unique identifier. The method also further comprises identifying, based on the obtained database records, a number of alphanumeric records in the second list having events in their respective histories that were obtained from an exclusive database of the one or more databases, wherein the exclusive database provides database records to only select users. The method further also comprises determining a percentage of alphanumeric records in the second list having negative events in their respective histories as compared to a total number of alphanumeric records for which any database record was returned from the one or more databases. Additionally, the method comprises generating a report including the determined percentage and conveying the report to the user via the communication circuit.

One aspect of the subject matter described herein comprises a system for identifying and analyzing database records. The system comprises means for transmitting and receiving information over a communication network. The system also comprises means for allowing user operation and interaction via the communication network and means for providing data to and receive data from the interface. The system also further comprises means for receiving a first list of records, the list comprising one or more alphanumeric records, wherein at least one unique identifier exists for each alphanumeric record. The system further comprises means for generating a second list of records comprising one or more alphanumeric records based on validating each of the alphanumeric records of the first list, wherein only validated alphanumeric records of the first list are included in the second list. The system further also comprises means for requesting, for each alphanumeric record in the second list, one or more database records from one or more databases via the communication network based on the unique identifier, wherein each obtained database record includes a history of events associated with the unique identifier. Additionally, the system comprises means for identifying, based on the obtained database records, a number of alphanumeric records in the second list having events in their respective histories that were obtained from an exclusive database of the one or more databases, wherein the exclusive database provides database records to only select users. Furthermore, the system comprises means for determining a percentage of alphanumeric records in the second list having negative events in their respective histories as compared to a total number of alphanumeric records for which any database record was returned from the one or more databases. Also, the system comprises means for generating a report including the determined percentage and means for conveying the report to the user via the communication circuit.

One aspect of the subject matter described herein comprises historical report valuation system. The system comprises a communication circuit, an interface, and a processor. The communication circuit is configured to receive information from one or more sources via a communication network. The interface is configured to allow user operation and interaction via the communication network. The processor is configured to provide data to and receive data from the interface. The processor is also configured to receive, via the interface, an inventory of vehicles, the inventory comprising at least one vehicle identified by at least one of a vehicle identification number (VIN), a license plate number, or other unique vehicle identifier. The processor is further configured to automatically obtain vehicle history records from one or more sources for each vehicle in the inventory when the inventory is received. The processor is also further configured to identify, based on the obtained vehicle history records, a number of vehicles in the inventory having events in their respective histories that reduce values of the respective vehicles. The processor is further also configured to automatically determine a percentage of vehicles in the inventory having events that reduce the values of the respective vehicles and automatically generate a report including the determined percentage for automatic conveyance to the user via the communication circuit with an alarm or notification when the percentage of vehicles in the inventory having events that reduce the values of the respective vehicles meets or exceeds a specified threshold.

BRIEF DESCRIPTION OF THE DRAWINGS

The above-mentioned aspects, as well as other features, aspects, and advantages of the present technology will now be described in connection with various aspects, with reference to the accompanying drawings. The illustrated aspects, however, are merely examples and are not intended to be limiting. Throughout the drawings, similar symbols typically identify similar components, unless context dictates otherwise. Note that the relative dimensions of the following figures may not be drawn to scale.

The figures depicted herein and the corresponding descriptions may utilize examples involving dealers, vehicles, and corresponding entities and items. However, these entities and items may be replaced with any saleable consumer good or item.

FIG. 1 illustrates one possible organization of a system that can provide dealerships with knowledge regarding an effect of a subscription history service on the dealerships, in accordance with an exemplary embodiment.

FIG. 9 is an example of a screenshot of the lift report generated by the historical report valuation system of FIG. 1, in accordance with an exemplary embodiment.

DETAILED DESCRIPTION

Figure 2:
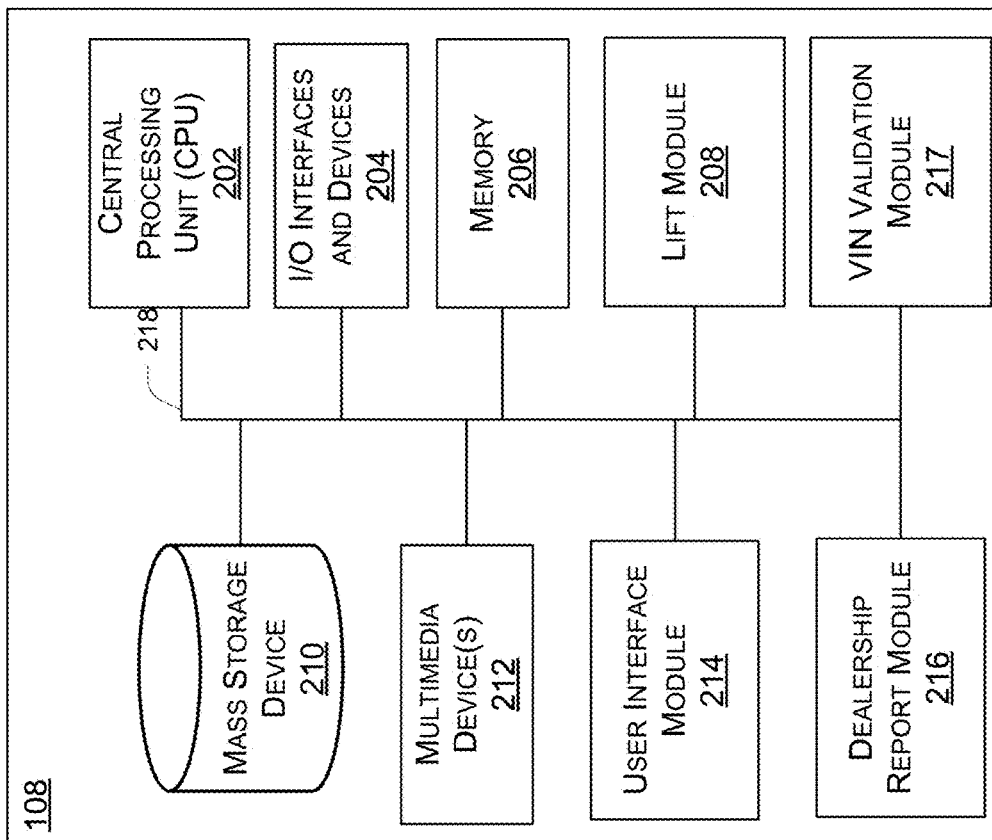
FIG. 2 is a block diagram corresponding to an aspect of a hardware and/or software component of an example embodiment of the system of FIG. 1.

Various aspects of the novel systems, apparatuses, and methods are described more fully hereinafter with reference to the accompanying drawings. The teachings disclosed may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different consumer goods and services industries. The detailed description and drawings are merely illustrative of the disclosure rather than limiting, the scope of the disclosure being defined by the appended claims and equivalents thereof.

Popular network technologies may include various types of wireless or wired networks. The wireless or wired network may be used to interconnect nearby devices together, employing widely used networking protocols. The various aspects described herein may apply to any communication standard, such as a wireless 802.11 protocol.

Dealers often purchase or accept used vehicles to later sell for a profit. However, in some situations, the parties from whom the dealers are purchasing or accepting the used vehicles may be unable or unwilling to disclose all details regarding the vehicles' histories. Accordingly, the dealer may purchase or accept a vehicle having one or more events in its history that cause a value of the vehicle to be lower than expected by the dealer. An aspect of the disclosure herein may provide a report regarding a dealer's inventory. The report may be based on a "lift" provided to the dealer by a vehicle history report service. The lift may correspond to a value or benefit that the dealer could receive from the vehicle history report service. For example, the lift may comprise a percentage that corresponds to a number of vehicles in an inventory with negative history events that the dealer was not aware of but could have been aware of by using the vehicle history report service. Alternatively, or additionally, the lift may comprise a percentage corresponding to a number of vehicles in the dealer's inventory that the dealer could have purchased at a lower price or avoided for monetary savings to the dealer. The lift may, thus, provide a dealer with a metric or measure by which the dealer can determine a usefulness of the vehicle history report service as it applies to a dealer's specific inventory.

Additionally, the dealer may be provided with an estimated return on investment ("ROI") based on the cost of the vehicle history report service as compared to the money saved as a result of using the vehicle history report service. For example, the ROI may be specific to each dealer dependent on the vehicles in the dealer's inventory. For example, when the dealer purchases and/or sells a large number of used vehicles (e.g., greater than 200 used vehicles per year), then the ROI may be greater than for a dealer that sells a small number of used vehicle (e.g., less than 20 used vehicles per year). The ROI may also or alternatively be dependent on the lift of the dealer.

FIG. 1 illustrates one possible organization of a system 100 that can provide dealerships with knowledge regarding a value and/or an effect of a subscription history service for or on the dealerships, in accordance with an exemplary embodiment. The system 100 comprises a terminal 102 (e.g., a terminal at a dealer), a vehicle history data store 104, one or more computing devices 106, a historical report valuation system 108, an exclusive vehicle history data store 109, and a network 110. Additionally, communication links are shown enabling communication among the components of system 100 via the network 110. In some embodiments, one or more of the devices (e.g., a server) and terminals described herein may be combined into a single server and/or terminal. In some embodiments, two or more of the components described above may be integrated. In some embodiments, one or more of the components may be excluded from the system 100. The system 100 may be used to implement systems and methods described herein.

In some embodiments, the network 110 may comprise any wired or wireless communication network by which data and/or information may be communicated between multiple electronic and/or computing devices. The terminal 102 may comprise any computing device configured to transmit and receive data and information via the network 110 at or by a dealer or an entity associated with the dealer. In some embodiments, the terminal 102 may comprise or have access to various records and information associated with the dealer, such as a vehicle inventory. The vehicle history data store 104 may comprise any vehicle history database or other vehicle information source that may provide vehicle history data based on a vehicle's unique identifier (e.g., a vehicle identification number, a license plate number, etc.). For example, the vehicle history data store 104 may comprise dealer records, state agency records, independent agency records, and the like. In some embodiments, the vehicle history data store 104 may comprise publicly available or "shared" sources only.

The one or more computing devices 106 may comprise any computing device configured to transmit and receive data and information via the network 110. In some embodiments, the computing device 106 may be configured to perform analysis of the transmitted and received data and information and/or perform one or more actions based on the performed analysis and/or the transmitted and received data and information. In some embodiments, the one or more computing devices 106 may comprise mobile or stationary computing devices. In some embodiments, the terminal 102 and the one or more computing devices 106 may be integrated into a single terminal or device.

The historical report valuation system 108 may comprise one or more devices and/or components that are configured to determine a lift available for a dealer by using one or more vehicle history data stores available only to the historical report valuation system 108 (e.g., exclusive, private, or individual sources, such as the exclusive vehicle history data store 109) and configured to generate a dealership report based on the lift. For example, the historical report valuation system 108 may comprise one or more databases to store information, e.g., vehicle history reports, dealer inventory information, dealer lift reports and associated information, etc. based on a vehicle's unique identifier (e.g., a vehicle identification number, a license plate number, etc.). In some embodiments, the historical report valuation system 108 may be configured to receive information from one or more of the terminal 102, the one or more computing devices 106, the vehicle history data store 104, and/or the exclusive vehicle history data store 109. In some embodiments, the historical report valuation system 108 may be configured to generate commands to or perform other actions in relation to the terminal 102 and/or the one or more computing devices 106. In some embodiments, the historical report valuation system 108 may be configured to generate commands to or perform other actions in relation to the vehicle history data store 104 and/or the exclusive vehicle history data store 109. The exclusive vehicle history data store 109 may comprise a vehicle history database or other vehicle information source that may provide vehicle history data based on a vehicle's unique identifier (e.g., a vehicle identification number, a license plate number, etc.). For example, the exclusive vehicle history data store 109 may comprise dealer records, state agency records, independent agency records, and the like. In some embodiments, contrary to the vehicle history data store 104, the exclusive vehicle history data store 109 may comprise only private or "exclusive" sources only, and thus may have information only available to the historical report valuation system 108.

For example, the historical report valuation system 108 may be configured to determine a subset of vehicles of a dealer inventory for which historical information is only available in exclusive or individual sources (e.g., the exclusive vehicle history data store 109). The exclusive or individual sources may include information regarding reported issues with one or more vehicles of the subset of vehicles, including accident and/or damage related events for one or more vehicles of the subset of vehicles. Once the subset of vehicles is determined, the historical report valuation system 108 may determine a lift value that the historical report valuation system 108 can provide to the dealer. In some embodiments, such determinations may involve identifying, accessing, and comparing information from disparate sources (e.g., the vehicle history data store 104 and the exclusive vehicle history data store 109) that are incapable of being directly compared and/or combined. In some embodiments, the historical report valuation system 108 may utilize various factors in determining the lift value. These factors may include inputs provided via the terminal 102 or one or more of the computing devices 106 and inputs generated from extensive market research and trends, among others. In some embodiments, the factors may be particular to each dealer and thus may provide individual lifts for each dealer.

The historical report valuation system 108 may be further configured to generate a dealership report. The dealership report may illustrate the relative benefit or value of using the exclusive vehicle history data store 109 as compared to using only the publicly shared vehicle history data store 104. In some embodiments, the dealership report may generate a dollar amount corresponding to an amount of money the dealer would save by using the one or more exclusive vehicle history data stores 109 in combination with or instead of the publicly shared vehicle history data stores 104. In some embodiments, the historical report valuation system 108 may generate alarms and/or notifications to the dealer and/or the user based on the generated amounts and/or determined value. In some embodiments, the historical report valuation system 108 may provide for threshold amounts or threshold changes to be established by the dealer or the user to allow the dealer and/or the user to receive the dealership report only when certain conditions are met. For example, the dealership report may be sent when the value of the one or more exclusive vehicle history data stores 109 meets or exceeds a specified value or when the dollar amount meets or exceeds a specified amount. Alternatively, or additionally, the dealership report may be sent when the lift reaches a threshold value or when a quantity of vehicle records only available in the exclusive vehicle history data store 109 reaches or crosses a threshold value.

FIG. 2 is a block diagram corresponding to hardware and/or software components of an example embodiment of the historical report valuation system 108 of FIG. 1. The hardware and/or software components as discussed below with reference to the block diagram of the historical report valuation system 108 may be included in any of the devices of the system 100 (e.g., the terminal 102, the computing devices 106, etc.). These components may be used to implement systems and methods described herein.

In some embodiments, certain modules described below, such as a lift module 208, a user interface module 214, or a dealership report module 216 included with the historical report valuation system 108 may be included with, performed by, or distributed among different and/or multiple devices of the system 100. For example, certain user interface functionality described herein may be performed by the user interface module 210 of the historical report valuation system 108 and/or by the user interface module 210 of the computing device 106.

In some embodiments, the various modules described herein may be implemented by either hardware or software. In an embodiment, various software modules included in the historical report valuation system 108 may be stored on a component of the historical report valuation system 108 itself, or on computer readable storage media or other component separate from the historical report valuation system 108 and in communication with the historical report valuation system 108 via the network 110 or other appropriate means.

The historical report valuation system 108 may comprise, for example, a computer that is IBM, Macintosh, or Linux/Unix compatible or a server or workstation. In some embodiments, the historical report valuation system 108 comprises a smart phone, a personal digital assistant, a kiosk, or a media player. In some embodiments, the historical report valuation system 108 may comprise more than one of these devices. In some embodiments, the historical report valuation system 108 includes one or more central processing units ("CPUs" or processors) 202, I/O interfaces and devices 204, memory 206, a lift module 208, a mass storage device 210, multimedia devices 212, the user interface module 214, the dealership report module 216, and a bus 218.

The CPU 202 may control operation of the historical report valuation system 108. The CPU 202 may also be referred to as a processor. The processor 202 may comprise or be a component of a processing system implemented with one or more processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information.

The I/O interface 204 comprises a keypad, a microphone, a touchpad, a speaker, and/or a display, or any other commonly available input/output (I/O) devices and interfaces. The I/O interface 204 may include any element or component that conveys information to a consumer or user of historical report valuation system 108 and/or receives input from the consumer or user. In one embodiment, the I/O interface 204 includes one or more display devices, such as a monitor, that allows the visual presentation of data to the consumer. More particularly, the display device provides for the presentation of GUIs, application software data, websites, web apps, and multimedia presentations, for example.

In some embodiments, the I/O interface 204 may provide a communication interface to various external devices. For example, historical report valuation system 108 is electronically coupled to the network 110 (FIG. 1), which comprises one or more of a LAN, WAN, and/or the Internet. Accordingly, the I/O interface 204 includes an interface allowing for communication with the network 106, for example, via a wired communication port, a wireless communication port, or combination thereof. The network 110 may allow various computing devices and/or other electronic devices to communicate with each other via wired or wireless communication links.

The memory 206, which includes one or both of read-only memory (ROM) and random access memory (RAM), may provide instructions and data to the processor 202. For example, inputs received by one or more components of the historical report valuation system 108 may be stored in the memory 206. A portion of the memory 206 may also include non-volatile random access memory (NVRAM). The processor 202 typically performs logical and arithmetic operations based on program instructions stored within the memory 206. The instructions in the memory 206 may be executable to implement the methods described herein. In some embodiments, the memory 206 may be configured as a database and may store information that is received via the user interface module 214 or the I/O interfaces and devices 204.

The historical report valuation system 108 may also include the mass storage device 210 for storing software or information (for example, the vehicle history reports or associated data, historical information, comparison data, etc.). Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. Accordingly, the historical report valuation system 108 may include, e.g., hardware, firmware, and software, or any combination therein. The mass storage device 210 may comprise a hard drive, diskette, solid state drive, or optical media storage device.

As shown in FIG. 2, the historical report valuation system 108 includes the dealership report module 216. In some embodiments, the dealership report module 216 may be stored in the mass storage device 210 as executable software code that is executed by the processor 202. This, and other modules in the historical report valuation system 108, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 2, the historical report valuation system 108 is configured to execute the dealership report module 216 to perform the various methods and/or processes as described herein.

In some embodiments, the dealership report module 216 may be configured to generate the dealership report mentioned above and further described in relation to FIG. 11. In some embodiments, the dealership report module 216 may utilize information received from the lift module 208 and/or the terminal 102 or the user of the computing device 106 of FIG. 1 to generate the dealership report for a specific dealer. For example, the historical report valuation system 108 may receive information that the dealer provides via the terminal 102, which the dealer had from previous transactions (e.g., the vehicle inventory, vehicle sales figures, etc.). In some embodiments, the historical report valuation system 108 may receive the information, and the dealership report module 216 may use this information in determining the dealership report for the dealer with regard to using the one or more exclusive vehicle history data stores as opposed to only the shared vehicle history data stores 104. The dealership report module 216 may also use the information for generating the dealership report. The dealership report module 216 may acquire and use information from one or more third party databases, such as lender systems, which may provide various data from which the dealership report may be determined and the dealership report generated.

For example, the historical report valuation system 108 may receive, from the third party databases such as the lender systems, information regarding the average values of vehicle sold in a region or an average valuation loss resulting from a negative event in a vehicle's history. These are examples of information that may greatly impact the dealership report as determined by the dealership report module 216 and presented to the dealer and/or user on the generated dealership report. In some embodiments, the dealership report module 216 may assist in generating a dealer's dealership report rating or level.

In some embodiments, the dealership report module 216 and/or the lift module 208 may identify a request for a dealership report determination and/or report or lift report as received from the dealer or user via the terminal 102 or computing device 106. In some embodiments, the request for the dealership report determination or report may include any of the information discussed herein. In some embodiments, the dealership report module 216 (or the processor 202) may use the information received to determine or identify the dealer dealership report or extrapolate additional information. The request may request all acquired and determined or identified data and/or records associated with the vehicle equity to be returned to the historical report valuation system 108 (e.g., for storage in the mass storage device 210). In some embodiments, the request for the lift report may include any of the lift information discussed herein. In some embodiments, the lift module 208 (or the processor 202) may use the information received from the user to determine or identify the list available to the dealer based on exclusive sources such as the exclusive vehicle history data store 109. The request for the lift report may include some information (e.g., the VINs of the dealer).

As shown in FIG. 2, the historical report valuation system 108 includes the lift module 208. The lift module 208 may determine the lift for a specific dealer based on the dealer's inventory and the vehicle history reports from exclusive and shared vehicle history data stores of the vehicles associated with the dealer's inventory. In some embodiments, the lift module 208 may be stored in the mass storage device 210 as executable software code that is executed by the processor 202. This, and other modules in historical report valuation system 108, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 2, historical report valuation system 108 is configured to execute the lift module 208 to perform the various methods and/or processes as described herein.

In some embodiments, the lift module 208 may be configured to identify a request, as received from the dealer using the terminal 102 or the user of the computing device 106 of FIG. 1. In some embodiments, the request for the lift determination or report may include dealer inventory as well as information about whether the lift information should be compared with lift information of other dealers, etc. In some embodiments, the dealer inventory may be saved as part of a dealer profile, for example, as associated with a dealer account with the historical report valuation system 108. Similarly, in some embodiments, the dealer or user may provide threshold information and/or information regarding what information and comparisons to make as part of the lift determination and/or report.

For example, the historical report valuation system 108 may receive, from the third party databases such as the lender systems and/or the one or more exclusive vehicle history data stores, information regarding the vehicle histories of vehicles in the dealer's inventory. These are examples of information that may greatly impact the lift values as determined by the lift module 208 and which are presented to the dealer and/or user on the generated lift report. In some embodiments, the lift module 216 may assist in generating the dealer's lift rating(s) or level(s).

In some embodiments, the lift module 208 may receive lift data and/or threshold criteria from the terminal 102 and/or the user computing devices 106. The lift module 208 may be configured to apply the information received in the lift request to the criteria received from the lender systems 110 or the terminal 102 to generate the requested lift determination. In some embodiments, the lift module 208 may request the dealer or the user identify or select the threshold values as described herein.

The historical report valuation system 108 also includes the user interface module 214. In some embodiments, the user interface module 214 may also be stored in the mass storage device 210 as executable software code that is executed by the processor 202. In the embodiment shown in FIG. 2, the historical report valuation system 108 may be configured to execute the user interface module 214 to perform the various methods and/or processes as described herein.

The user interface module 214 may be configured to generate and/or operate user interfaces of various types. In some embodiments, the user interface module 214 constructs pages, applications ("apps") or displays to be displayed in a web browser or computer/mobile application. In some embodiments, the user interface module 214 may provide an application or similar module for download and operation on the terminal 102 and/or the computing devices 106, through which the dealer/user and the historical report valuation system 108 may interact. The pages or displays may, in some embodiments, be specific to a type of device, such as a mobile device or a desktop web browser, to maximize usability for the particular device. In some embodiments, the user interface module 214 may also interact with a client-side application, such as a mobile phone application (an "app"), a standalone desktop application, or user communication accounts (e.g., e-mail, SMS messaging, etc.) and provide data as necessary to display vehicle equity and prequalification determinations.

For example, as described herein, the historical report valuation system 108 may be accessible to the dealer via a website (e.g., the dealer's website or the historical report valuation system 108 website) which may include a banner ad or widget for lift and/or dealership reports. In some embodiments, the dealer or user may select only lift or dealership report and may opt out of the other of the determinations or reports. In some embodiments, the dealer and/or user may also provide their consent to have the dealer inventory acquired and uploaded by the historical report valuation system 108.

In some embodiments, the historical report valuation determinations, historical report valuation reports, and/or historical report valuation alarms or notifications are examples of communications that may be made automatically once the dealer inventory is provided. In some embodiments, these communications may be specially formatted to be simultaneously communicated to the dealer and/or user via multiple communications methods and/or formats (e.g., text, e-mail, call, mail, etc.) so the dealer and/or user may receive the communication promptly.

In some embodiments, a user may use one of the terminal 102 and the computing devices 106 to access the historical report valuation system 108. In some embodiments, the user may use the historical report valuation system 108 itself. The user may be working with and/or representing a dealer and/or a service provider and may wish to generate or identify a lift or ROI for the dealer as provided by the historical report valuation system 108. The historical report valuation system 108 (e.g., the lift module 208 or the processor 202) may request the user provide or prompt the user for an inventory of used vehicles owned by the dealer, which the user may provide. For example, the user of the terminal 102 may access a website or web app for the historical report valuation system 108 and may be prompted to provide a list of all used vehicles owned by the dealer. This list may include vehicle identification numbers ("VINs") for all used vehicles owned by the dealer over some period of time. In some embodiments, the VIN list may also include some information about the dealer, including annual sales numbers, dates of sales/purchases, etc. In some embodiments, the historical report valuation system 108 may already have a copy of the dealer's VIN list stored in the memory 206 or the mass storage device 210 and may automatically retrieve the stored information when the user selects the corresponding dealer from the website or web app. In some embodiments, the user may retrieve the dealer's inventory from another entity that may report or provide the inventory on behalf of the dealer.

Once the historical report valuation system 108 receives the inventory information, the user may view the inventory information via the I/O interfaces and devices 204 and/or the user interface module 214 or via the terminal 102 or the computing device 106. Once the historical report valuation system 108 receives the VIN list (e.g., via the I/O interfaces and devices 204 or via the user interface module 214), the processor 202 or the lift module 208 may store the received list in the memory 206 and/or the mass storage device 210. In some embodiments, the received dealer VIN list may be parsed and/or manipulated by the processor 202 or the lift module 208 to generate a new list in a new format. In some embodiments, the processor 202 or the lift module 208 (or the memory 206 or the mass storage device 210) may generate a new list identifying or including only information from the dealer's inventory that is useful for generating the lift or corresponding reports of the dealer (e.g., unique VINs, dates of purchase/sale, etc., quantity of used vehicles). In some embodiments, generating the new list by the processor 202 or the lift module 208 may comprise reviewing the dealer's inventory and removing duplicate VINs, verifying that the included VINs are valid, etc., so that the new list comprises only a single set of valid information for each used vehicle owned by the dealer.

In some embodiments, the VINs list, VINs file, or VIN data table may prove problematic for processing. The VINs in the VINs file or the VIN data table may be alphanumeric identifiers where each sequence of alphanumeric identifiers comprises various segments or portions, as explained in relation to FIG. 3. Thus, the arrangement and/or order of characters in the VINs list, VINs file, or VIN data table must be in the proper order for the identifiers to be correct. This may be due to a large quantity of VINs in the VINs list, VINs file, or VIN data table or due to defective or invalid VINs in the VINs list, VINs file, or VIN data table. As one potential solution, defective, duplicate, or invalid VINs may be removed from the VINs list, VINs file, or VIN data table to reduce processing and to avoid delays caused by attempting to process invalid or defective VINs. Additionally, the filtering of defective, duplicate, or invalid VINs may also reduce the quantity of VINs that need to be processed. In some embodiments, the processing of the VINs file or data table may be batched so as to perform all the processing at a single session. This may reduce overhead during critical processing times by allowing for scheduling of the processing of the VINs as described herein.

In some embodiments, the processor 202 or the lift module 208 may not be used to generate the new list, but rather the computing device 106 or the terminal 102 may just forward the dealer inventory to the historical report valuation system 108 via the network in a validated list without need for additional modification. In some embodiments, the inventory information may be provided directly to the historical report valuation system 108 (bypassing the party using the computing device 106), and the historical report valuation system 108 may automatically place the received inventory information in a proper format.

In some embodiments, the processor 202 or the lift module 208 uses the new list comprising only the valid used vehicles VINs to generate vehicle history report requests from the vehicle history data store 104 and the exclusive vehicle history data store 109 of FIG. 1. The processor 202 or the lift module 208 may store the vehicle history reports received from the vehicle history data store 104 and the exclusive vehicle history data store 109 in the memory 206 and/or the mass storage device 210. Once the vehicle history reports are obtained and/or stored, one of the processor 202 or the lift module 208 may compare the vehicle history reports received from the vehicle history data store 104 and the vehicle history reports received from the exclusive vehicle history data store 109. Details regarding the comparison of the vehicle history reports from the vehicle history data store 104 and the exclusive vehicle history data store 109 are provided herein, for example, in relation to FIGS. 5-10.

In some embodiments, the processor 202 and/or the lift module 208 may generate a lift report based on the list (e.g., new and/or original), the vehicle history reports from the vehicle history data stores 104, and the vehicle history reports from the one or more exclusive vehicle history data stores 109. In some embodiments, the lift report may comprise a listing of the unique VINs for each used vehicle in the dealer inventory with corresponding events from the vehicle history reports received from the shared vehicle history data stores 104 and events from the vehicle history reports received from the one or more exclusive vehicle history data stores 109. An example of this listing is shown in relation to spreadsheet 1000 of FIG. 10 below. The events listed in the lift report may comprise events that reduce a value of the associated vehicle (e.g., accidents, title issues, etc.).

The events listed in the spreadsheet 1000 may be used by the processor 202 or the lift module 208 to generate the lift report 900 as shown in FIG. 9. For example, the lift report 900 may comprise a column of VINs with corresponding columns of dates and events received from the shared vehicle history data stores 104 and corresponding columns of dates and events received from the exclusive vehicle history data stores 109. The lift report 900 may also comprise data corresponding to: (a) a total number of used vehicles identified in the dealer inventory (e.g., a total number of used vehicle VINs received from the terminal 102); (b) a total number of the VINs that are processed (e.g., a total number of VINs after duplicate and improper VINs have been removed from the dealer inventory); (c) a total number of the VINs having vehicle history reports (e.g., total number of VINs having records in the vehicle history data stores 104); (d) a total number of VINs having negative events in their vehicle history reports received from the vehicle history data stores 104; (e) a percentage of the total number of VINs having vehicle history reports that include negative events (e.g., (d)/(c)); (f) a total number of additional VINs having negative events in found only in the one or more exclusive vehicle history data stores 109; and (g) a percentage of the total number of VINs having negative events that were only found in vehicle history reports from the one or more provided vehicle history data stores (e.g., (f)/(c)). An example of the lift report 900 discussed in further detail is included in relation to FIG. 9. In some embodiments, the lift report 900 comprises additional information other than that listed here (e.g., detailed numbers regarding types of issues reported, as broken down between the publicly available and exclusive vehicle history data stores and corresponding percentages, etc.). In some embodiments, the lift report comprises less information than that listed here (e.g., without individual breakdowns of events found by shared and exclusive sources, etc.).

Based on the generated lift report, the processor 202 or the lift module 208 may identify lift data (corresponding to information that is only available via the exclusive vehicle history data stores 109) in relation to the data received from the shared vehicle history data stores 104. For example, the lift report 900 may include comparisons of a number of events identified by the one or more exclusive vehicle history data stores 109 as compared to a number of events identified by the shared vehicle history data stores 104.

In some embodiments, the processor 202 or the module 208 or 216 may be configured to establish threshold values for one or more of the generated numbers or percentages of the lift report 900. The threshold values may be used to identify situations of interest to the user of the computing device 106 or the terminal 102 or of interest to the dealer. For example, the processor 202 or the module 208 or 216 may prompt the user to identify maximum thresholds for any of the values of the lift report 900, for example values (e) or (g) above. Accordingly, the processor 202 or the module 208 or 216 may generate an alarm or notification to the user based on the provided thresholds and the calculated lift report values. The alarm or notification may be forwarded to the terminal 102 or computing device 106. In some embodiments, the maximum thresholds may be selected by the dealer or user via the terminal 102 or by the computing device 106. In some embodiments, the thresholds may be tied to the dealership report generating described below.

In some embodiments, the processor 202 or the module 208 or 216 may be configured to track and evaluate historical information from the generated lift report 900 or from the determined but not reported lift values. For example, processor 202 or the module 208 or 216, in conjunction with data stored in the memory 206 or the mass storage device 210, may be configured to provide historical percentages for (c) and (g) described above to allow the user or the dealer to evaluate trends and/or perform associated analysis. In some embodiments, the processor 202 or the module 208 or 216 may be configured to generate ratings or levels (e.g., a numerical rating or level) of the dealer's inventory as compared to the historical information and/or as compared to other dealers' inventories. For example, the dealer rating or level may provide a relative ranking of a specific dealer versus other dealers of the same owner, region, or manufacturer. In some embodiments, the dealer rating or level may provide an absolute rating or level. In some embodiments, when a rating or level of the dealer is higher than that of other dealers, the dealer's inventory has a higher number of vehicles having negative events than the inventories of the other dealers. In some embodiments, when the rating or level of the dealer is lower than that of the other dealers, the dealer's inventory has a lower number of vehicles having negative events than the inventories of the other dealers, or vice versa. In some embodiments, a party interested in purchasing a used vehicle may use the ratings or levels to determine which dealer is likely to the inventory with the least negative events. In some embodiments, identified percentages may include percentages directed to particular vehicle types (e.g., sedan, coupe, truck, etc.), manufacturers/makes, vehicle models, etc., that have negative events in the exclusive versus the shared history data stores. Dealers may be rated based on any of the percentages identified herein.

In yet another embodiment, the dealer rating or level can be determined, by the processor 202 or the module 208 or 216, from the time the dealer first begins tracking historical report valuation data to the present day. For instance, a dealer rating or level for a dealer having five years of lift data can be determined one time for each year, so that multiple ratings or levels steadily or rapidly improve or decline based on the reported dealer inventory as compared to other dealers' inventories. Additionally, this same dealer's rating or level can also be projected into the future, showing, for example, how a dealer's rating or level may further improve or decline over time given historical trends. In some embodiments, the dealer's rating or level may be scaled. The scale for the rating or level will be well known to be variable by those of skill in the art. One embodiment may produce ratings or levels between 0 and 100, another 0 to 10, yet another between 0% and 100%, another between 100 and 1000, and various other numerical ranges. Conveying the range of the scale to a user should provide sufficient context for a user to interpret the dealer's ratings or levels that are reported. For example, range information may include absolute highest and lowest actual and/or theoretical ratings or levels for all dealers (e.g., of a specific manufacturer or within a specific region, etc.) for which an embodiment of the disclosure has information. In an embodiment, a user may be presented a range of some or a majority of the ratings or levels of any dealer in the memory 206 or the mass storage device 210 of the historical report valuation system 108. In some embodiments, the dealer rating(s) and/or level(s) may be provided to a consumer, and the consumer may use the rating and/or level to identify a dealer for the consumer's patronage.

In some embodiments, the processor 202 or the module 208 or 216 may provide the dealer (e.g., via the terminal 102) or the user (e.g., via the computing device 106) with the lift reports 900 based on the thresholds described above. For example, the processor 202 or the module 208 or 216 may be configured to analyze a dealer's inventory and identify the data values, e.g., data values (a)-(g) described above, for tracking purposes but may not generate the lift report 900 unless one or more of the identified values exceeds a dealer, user, or system determined threshold. Once the threshold is met or exceeded, the processor 202 or the module 208 or 216 may generate the report for the dealer or user. In some embodiments, the processor 202 or the module 208 or 216 may generate an alarm (e.g., via the I/O interfaces and devices 204) or may generate the lift report 900 based on trends of the data. For example, if the data indicates that negative events identified via the one or more exclusive vehicle history data stores 109 are not identified by the shared vehicle history data stores 104 at a threshold level, then the processor 202 or the module 208 or 216 may generate the notification to the dealer and/or user or may generate the lift report 900 for submission to the dealer and/or the user.

In some embodiments, the processor 202 or the module 208 or 216 may be configured to track and evaluate historical information from the generated lift report 900 or from the determined lift values. For example, the processor 202 or the module 208 or 216 may provide historical percentages for a dealer's lift as described herein, to allow the user or the dealer to evaluate trends and/or perform associated analysis. In some embodiments, the processor 202 or the module 208 or 216 may generate ratings or levels (e.g., a numerical ratings or level) of the dealer's dealership report as compared to the historical information or as compared to other dealers' dealership reports. For example, the dealer rating or level may provide a relative ranking of a specific dealer versus other dealers of the same owner, region, or manufacturer. In some embodiments, the dealer rating or level may provide an absolute rating or level.

Each item sold by a merchant may have a history that impacts a value of the item. In some situations, the merchant may not be aware of the history of the item until after the merchant purchases the item. Such a scenario may expose the merchant to potential losses if the item has a history that depreciates its value. For example, the merchant may purchase a used vehicle assuming the vehicle has no negative history (e.g., no thefts, accidents, etc.) with intent to sell the used vehicle with a price A. However, if the merchant later learns that the used vehicle had been previously stolen and sold at auction, the merchant may have to reduce its sales price for the used vehicle to a price B that is less than the price A. The difference between the price A and the price B comprises an example of a loss felt by the merchant. In some embodiments, a service may exist that allows the merchant to increase its chances of identifying issues with used items purchased before the initial sale is completed. In some embodiments, the historical report valuation system 108 may be configured to identify a value of the service to the merchant.

For example, the processor 202 or the module 208 or 216 may provide benefits of using the exclusive vehicle history data store 109 as compared to not using the exclusive vehicle history data store 109. In some embodiments, the processor 202, the lift module 208, or the dealer report module 216 may provide an average benefit to the merchant or a customized benefit based on the lift report 900 to the merchant. In some embodiments, the benefit calculation, whether the average benefit or the customized benefit, may be a comparison between a cost of the exclusive vehicle history data store 109 and savings the service may provide. The benefits calculation may utilize historical trends of the merchant (or industry) in order to generate a prediction of the future benefits. The average benefit may comprise a benefit that is determined or calculated based on inputs that are generated as averages for an industry, geographic area, etc. The customized benefit may comprise a benefit that is determined or calculated based on inputs that are specific to the merchant.

In some embodiments, a user of one of the computing devices 106 or the terminal 102 may interact with the historical report valuation system 108 to determine the average or the customized benefit of the historical report valuation system 108 to the merchant. When determining the average benefit with the historical report valuation system 108, the user may utilize various values in the benefit calculation. The values may comprise an average total number of sales by one or more entities that are similar to the merchant. Similar entities may comprise other entities of a similar size, geographic location, industry, etc. Additionally, the values may comprise an average number of reduced value items of the average total number of sales, where the average number of reduced value items comprises a number of items that have reduced values when sold as compared to the expected sale price when purchased by the merchant. The values may also comprise a price difference for each item having a reduced value (e.g., a difference between price A and price B described herein). The benefit calculation may comprise a total price reduction for all reduced value items combined as compared to the cost of the service. In some embodiments, such benefit calculation may be performed by the processor 202 or the lift module 208 or the dealership report module 216.

When determining the customized benefit, the user may utilize customized or merchant specific values in the benefit calculation. The merchant specific values may comprise a total number of sales by the merchant. Additionally, the merchant specific values may comprise a merchant specific number of reduced value items of the merchant specific total number of sales, where the merchant specific number of reduced value items comprises a number of items that have reduced values when sold as compared to the expected sale price when purchased by the merchant. The merchant specific values may also comprise an average price difference for each merchant item having a reduced value (e.g., merchant specific difference between price A and price B described herein). The merchant specific benefit determination may comprise a total price reduction for all reduced value items of the merchant combined as compared to the costs of the service. In some embodiments, the average price difference may be an average specific to the merchant (e.g., based on the merchant's items).

In some embodiments, determining the customized benefit may involve analyzing an inventory list of the merchant. Based on the inventory list, the historical report valuation system 108 may determine whether the historical report valuation system 108 is able to provide information from exclusive sources that are not available to other reporting systems or entities. Accordingly, the historical report valuation system 108 may determine the benefit specific to the merchant.

In another embodiment, the lift module 208 and the dealership report module 216 (and/or other module of the historical report valuation system 108) disclosed herein may be combined or configured to determine the lift and/or generate the dealership report described herein. In some embodiments, the historical report valuation system 108 (e.g., via the processor 202 or the I/O interfaces and devices 204) may receive a batch file including dealer inventory and historical report valuation thresholds. The historical report valuation system 108 (e.g., via the processor 202) may parse the batch files received and provide the parsed information for the necessary lift determination and/or report generation.

In some embodiments, one or more windows or interactions between the historical report valuation system 108 and the user and/or the dealer may involve a lightbox or overlay layer. For example, a lightbox or overlay may comprise a format that displays images and/or videos and text or prompts by filling the screen, and dimming out the rest of the web page or display. The lightbox or overlay may, alternatively, or additionally, place a new set of images, information, or prompts over existing data while maintaining the existing data though it is covered (and thus not as easily viewable) while the new set of information is visible. For example, the overlay or lightbox may be used to present the initial widget and/or browsing object.

The historical report valuation system 108 may also include one or more multimedia devices 212, such as speakers, video cards, graphics accelerators, and microphones, for example.

The historical report valuation system 108 may also include a VIN Validation Module 217. The VIN validation module 217 may include code, processors, or other components configured to validate alphanumeric identifiers or VIN numbers that are received. The VIN validation module 217 may use any method of validating the VINs. For example, the VIN validation module 217 may perform calculations to ensure that VIN is correct based on a check digit in the VIN.

The various components of the historical report valuation system 108 may be coupled together by a bus system 218. The bus system 218 may include a data bus, for example, as well as a power bus, a control signal bus, and a status signal bus in addition to the data bus. In different embodiments, the bus could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of the historical report valuation system 108 may be combined into fewer components and modules or further separated into additional components and modules than that shown in FIG. 2.

Figure 3:
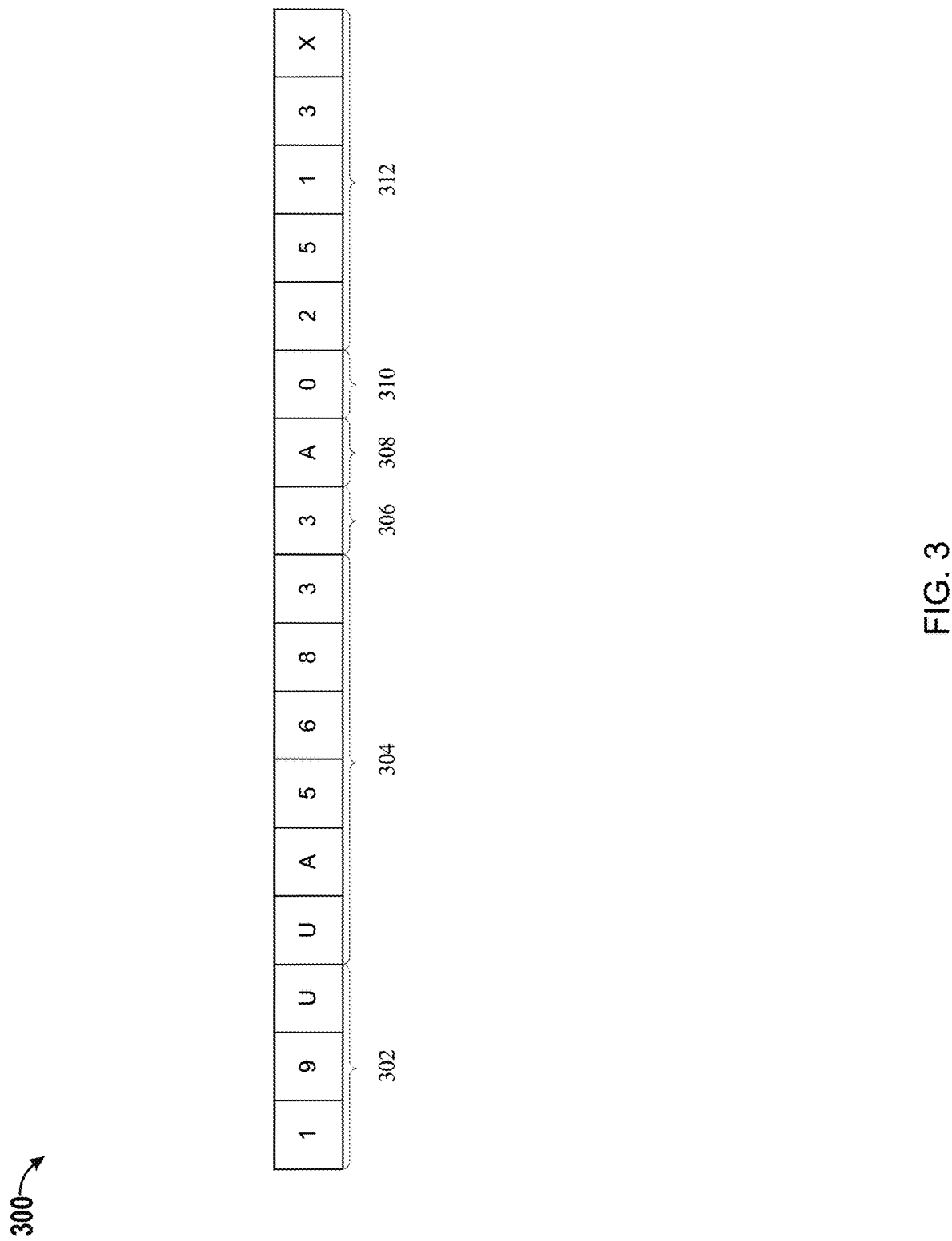
FIG. 3 is a depiction of various sections of a North American VIN.

FIG. 3 is a depiction of various sections of a North American VIN 300. As shown, the VIN may include 17 alphanumeric characters. In North America, the VIN may be divided into six (6) segments or portions. In other areas of the world, the VIN may include a different number of total characters or may be divided into a different number or segments or portions. The first portion 302 may include the first three (3) characters (from left to right) of the VIN 300. The second portion 304 may include the next five (5) characters of the VIN 300. The third portion 306 may include a single (1) character of the VIN 300. The fourth portion 308 may also include a single (1) character of the VIN 300. The fifth portion 310 includes a single (1) character of the VIN 300, and the sixth portion 312 includes the last six (6) characters of the VIN 300. In some areas, the VIN segments may represent different identifiers or information.

The first portion 302 may indicate a "world manufacturer identifier," which identifies a manufacturer of the vehicle to which the VIN belongs. The first character of the portion 302 may correspond to a region of the world in which the manufacturer is located. The portion 304 indicates a "vehicle descriptor section" or "VDS" that may identify a vehicle type and may include information regarding the vehicle's platform, model, body style, and/or engine type. The portion 306 may act as a check digit for the VIN. The portion 308 may represent the encoded model year for the VIN. The portion 310 may represent a plant code for the VIN that identifies a factory in which the vehicle having the VIN was built. Each manufacturer may have its own plant codes. The portion 312 may represent a serial number of production number for the vehicle having the VIN. In addition, to these breakdowns, particular characters cannot be used anywhere in VINs, such as "I," "O," and "Q." Furthermore, the letters "U" and "Z" and the number "0" cannot be used in portion 308 for the model year.

Based on knowledge of the portions and permissible values in the VIN, the processor 202 of the historical report valuation system 108 or any other component of the system 100 may identify valid VINs. As discussed herein, invalid VINs may be removed from VIN lists or VIN data tables to avoid processing of invalid information.

Figure 4:
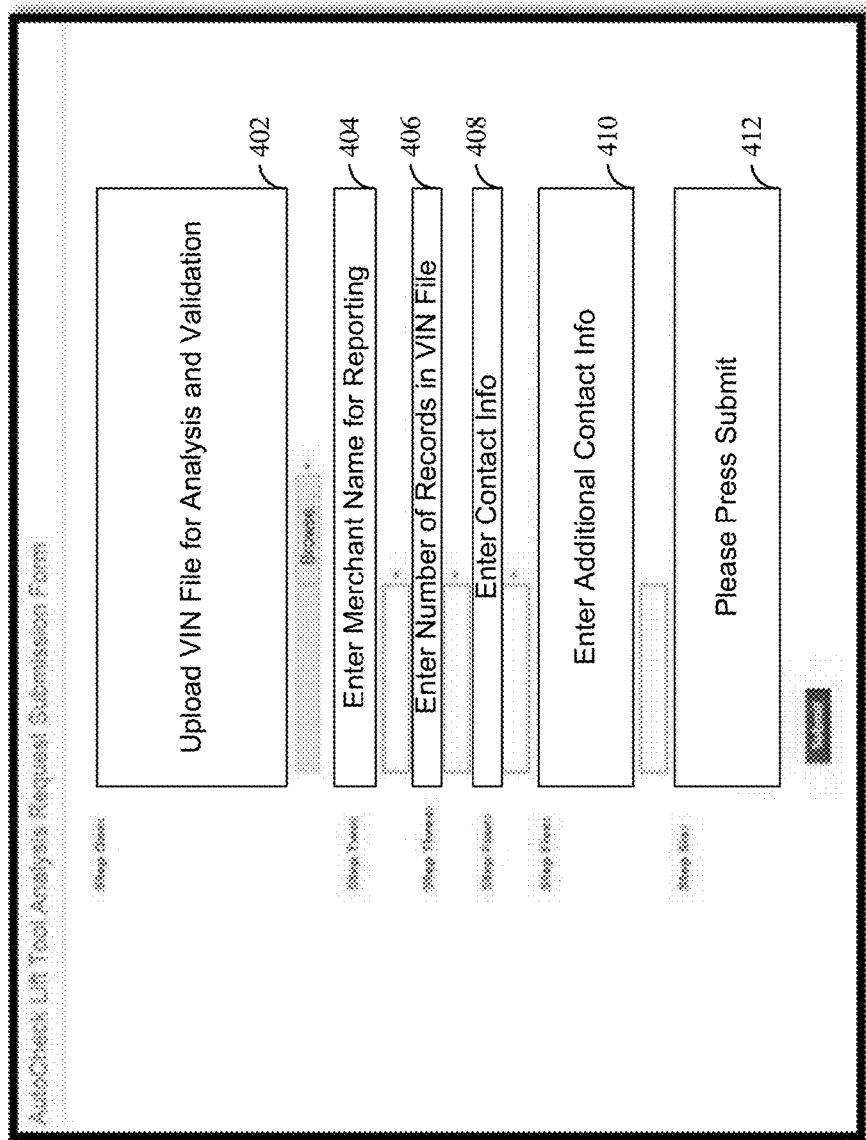
FIG. 4 is an example of a screenshot of a website used to input information based on which the historical report valuation system of FIG. 1 generates a lift report.

FIG. 4 is an example of a screenshot of a website 400 used to generate the lift report by the system of FIG. 1. The lift website 400 shown may be generated by one of the user interface module 214, the I/O interfaces and device 204, and the lift module 208 of the FIG. 2. In some embodiments, the lift website 400 may provide an interface for the user to provide information to the historical report valuation system 108.

The lift website 400 may include various data entry prompts for input of data by the user and/or one or more modules of the historical report valuation system 108. The lift website 400 includes a prompt 402 that instructs the user to upload a file of VINs (e.g., in comma separated value (CSV) format or any other format) for analysis and determination of benefit of the historical report valuation system 108. In some embodiments, the file of VINs may include an inventory for a dealer (e.g., an inventory of used vehicles). In some embodiments, the CSV file of VINs may be stored in the memory 206 of FIG. 2 as a database file or similar structure. The lift website 400 further includes a prompt 404 to the user to enter a total number of records included in the VIN file. The total number of records received from the prompt 404 may be used to confirm the number of VINs in the received VIN file. If the numbers do not match, then the website (e.g., via the lift module 208 or the processor 202) may generate an alarm or error message to the user. The lift website 400 further includes a prompt 406 to the user to enter a total number of records included in the VIN file. This prompted value may be used by the historical report valuation system to confirm a number of VINs included in the uploaded VIN file.

In some embodiments, the VIN file may be received in CSV format because the VINs and other data in the VINs file will generally be alphanumeric characters. By utilizing simple CSV file formats, overhead may be reduced by not requiring conversion between more complicated file formats and simplicity is improved.

The prompts 408 and 410 of the lift website 400 may request that the user enter contact information for the user or for a person to whom the lift report is to be sent and/or distributed. The prompt 412 may then instruct the user to submit the information entered on the lift website 400. Once the user submits the entered information, the lift website 400 may convey one or more pieces of the entered information to the historical report valuation system 108 (e.g., the lift module 208).

In some embodiments, uploading the VIN file may comprise handling and uploading large data files, and the resulting reports may be even larger once combined with information regarding VIN events. Thus, the various compression methods may be used to reduce sizes of files and the verification/validation of VINs in the VIN file may be used to reduce unnecessary processing and communication of excessively large files. Furthermore, the VIN files may be limited in size to further reduce the need to process large quantities of data and communicate the large quantities of data. In some embodiments, the VINs may be verified or validated using any known method of verification or validation.

Figure 5:
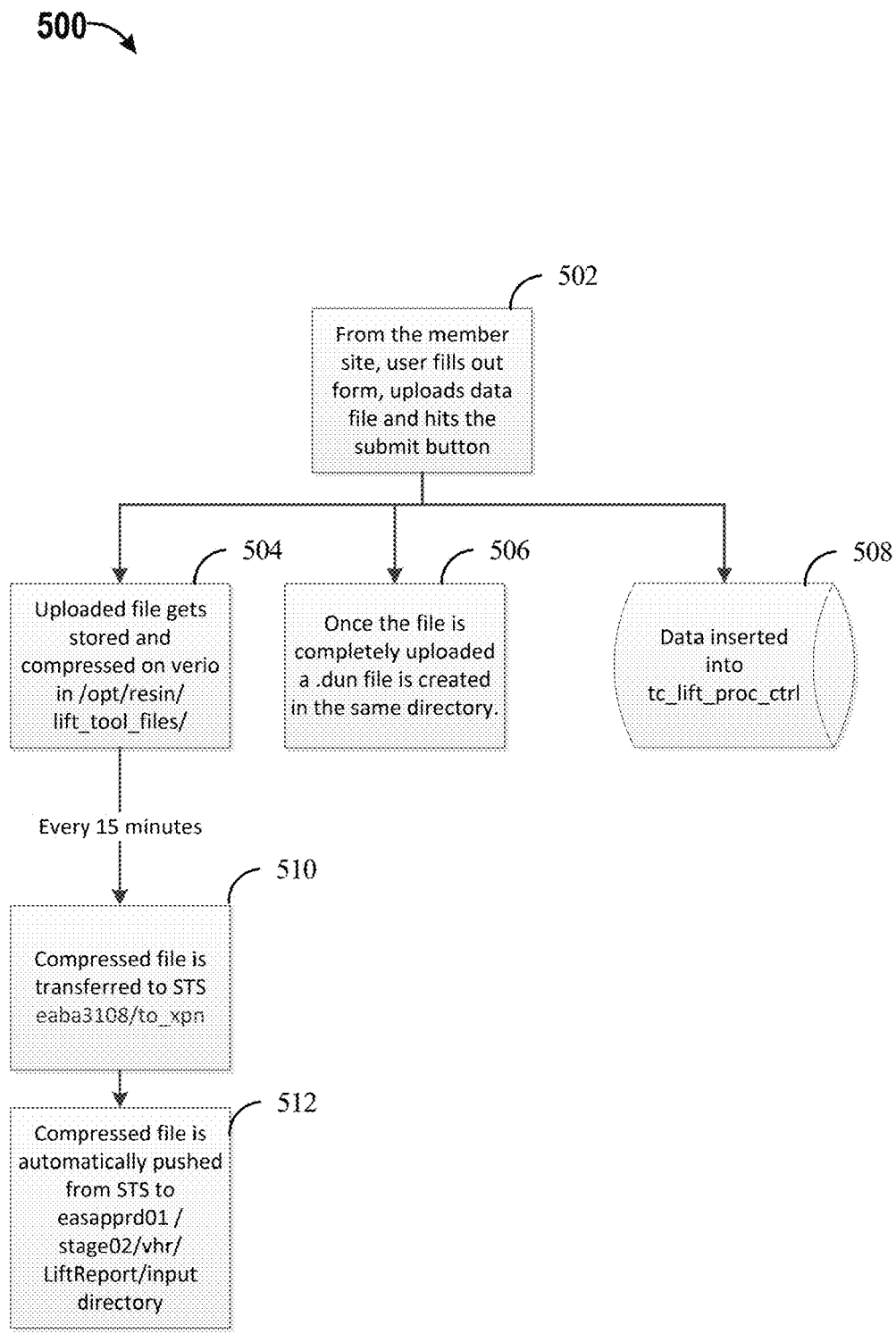
FIG. 5 is a data flow diagram for a lift report process of the system of FIG. 1.

FIG. 5 is a data flow diagram for a lift report process or method 500 of the system 100 of FIG. 1, in accordance with an exemplary embodiment. Method 500 is an exemplary description of a method that may involve the user using the terminal 102 or one of the computing devices 106 and the historical report valuation system 108. Methods similar to method 500 may be run simultaneously, in an overlapping manner, or sequentially for multiple dealers or users that are each accessing the historical report valuation system 108 via one or more terminals 102 or via users with computing devices 106. In some embodiments, particular steps of the method 500 may be implemented by the processor 202, as referenced in FIG. 2. In some embodiments, one or more of the steps of the method 500 are implemented by one or more of the other components of the historical report valuation system 108, as referenced in FIGS. 1 and 2. In some embodiments, the blocks of the method 500 are performed in a sequential manner, while in other embodiments, the blocks of the method 500 may be performed in a non-sequential manner, regardless of the terminology used to describe the method 500 herein. A person having ordinary skill in the art will appreciate that the method 500 may be implemented by other suitable devices and systems. Although the method 500 is described herein with reference to a particular order, in various aspects, blocks herein may be performed in a different order, or omitted, and additional blocks may be added.

The method 500 may begin at block 502, where the user accesses a website or web app (website) via the Internet or similar network (e.g., the lift website 400). The lift website 400, as discussed herein, may provide the user with an ability to provide and/or upload information. This information, as discussed herein, may include the dealer inventory of VINs and may be used by the historical report valuation system 108. Thus, at block 502, the user may access the lift website 400 and upload the VIN file and other information as described in relation to FIG. 4 via the lift website 400.

Once the information is entered at block 502, the uploaded VIN file may be stored at block 504. In some embodiments, the uploaded VIN file may be stored in a particular format (e.g., the original CSV format). In some embodiments, the VIN file may be compressed and stored (e.g., by the processor 202 or the lift module 208) in the memory 206. At block 506, once the VIN file is stored at block 504, or simultaneously with storing the VIN file at the block 504, the processor 202 or the lift module 208 may generate a confirmation of the storage of the VIN file in the memory 206. The confirmation may also be stored in the memory with the stored VIN file. Additionally, the processor 202 or the lift module 208 may take the data from the VIN file and store it in a VIN data table for further processing at block 508.

At block 510, the processor 202 or the lift module 208 may transfer the compressed and stored VIN file from block 504 to a storage or file sharing system. In some embodiments, at block 512, the processor 202 or the lift module 208 may push the VIN file from the storage or file sharing system to another memory location (e.g., in the memory 206 or in another location). In some embodiments, the steps of blocks 510 and 512 may occur on a periodic basis (e.g., every 15 minutes or every hour).

Figure 6:
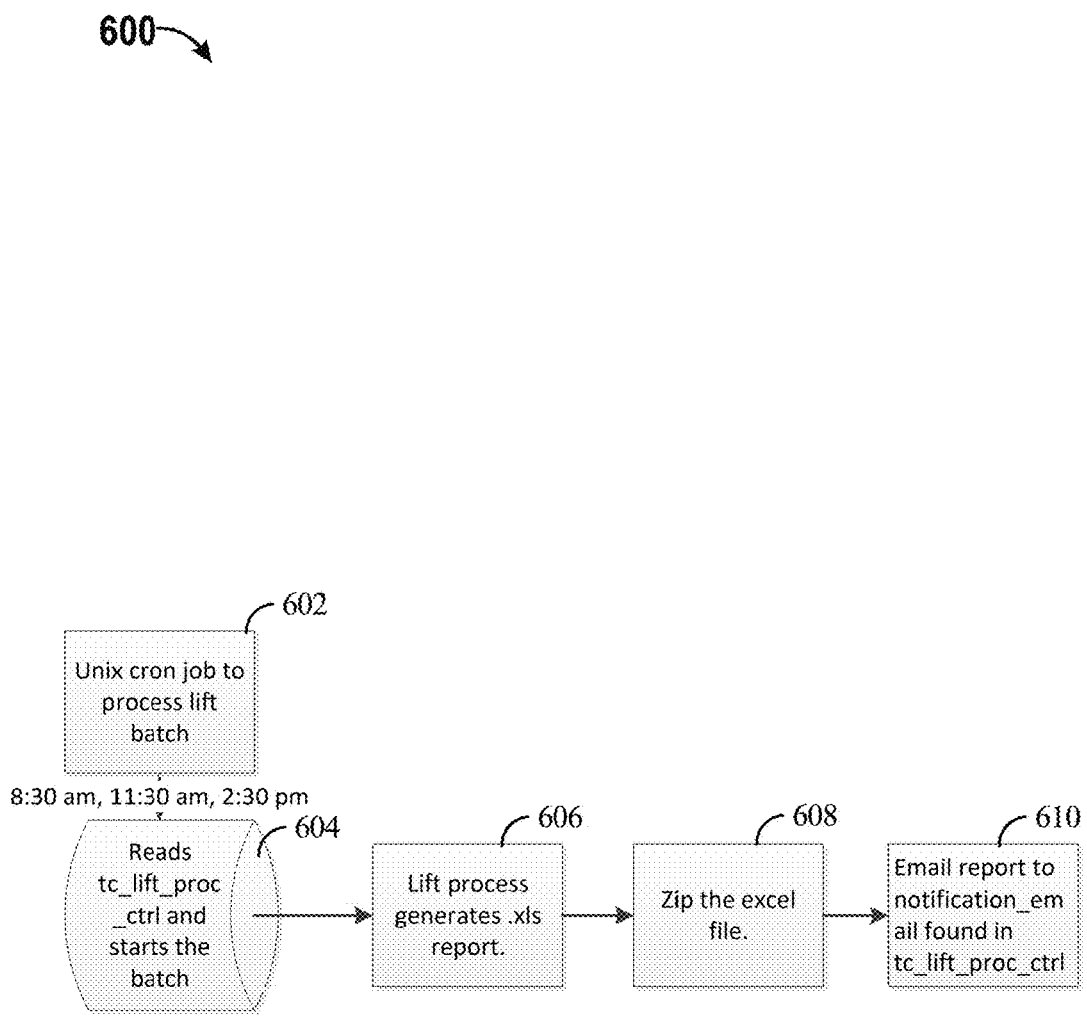
FIG. 6 is a data flow diagram for generating a lift report according to the data of the flow diagram of FIG. 5.

FIG. 6 is a data flow diagram for a method 600 of generating a lift report according to the data of the flow diagram of FIG. 5. Method 600 is an exemplary description of a method that may involve the user using the terminal 102 or one of the computing devices 106 and the historical report valuation system 108. Methods similar to method 600 may be run simultaneously, in an overlapping manner, or sequentially for multiple dealers or users that are each accessing the historical report valuation system 108 via one or more terminals 102 or via users with computing devices 106. In some embodiments, particular steps of the method 600 may be implemented by the processor 202, as referenced in FIG. 2. In some embodiments, one or more of the steps of the method 600 are implemented by one or more of the other components of the historical report valuation system 108, as referenced in FIGS. 1 and 2. In some embodiments, the blocks of the method 600 are performed in a sequential manner, while in other embodiments, the blocks of the method 600 may be performed in a non-sequential manner, regardless of the terminology used to describe the method 600 herein. A person having ordinary skill in the art will appreciate that the method 600 may be implemented by other suitable devices and systems. Although the method 600 is described herein with reference to a particular order, in various aspects, blocks herein may be performed in a different order, or omitted, and additional blocks may be added.

The method 600 may begin at block 602, where the processor 202 or the lift module 208 may initiate or generate a batch process to analyze the data from the VIN file as provided by the user. The VIN data table may be processed in batch at particular times of day due to processing required by the quantity of VINs that may exist in the VIN data file. For example, the batch processing of the VIN data table (and other VIN data tables from other user uploads of VIN files) may all occur at 8 am, 12 pm, and 4 pm. In some embodiments, the batch processing of the VIN data table(s) may occur at off-peak hours, such as at 10 pm, 1 am, and 4 am.

In some embodiments, block 602 may involve reviewing the VIN data file due to the processing required to analyze the data provided in the VIN file to determine if the VIN data table meets particular requirements. For example, the processor 202 or the lift module 208 may check to see if the quantity of VINs in the VIN data table exceeds a threshold number. If so, the processor 202 or the lift module 208 may generate a message indicating that the VIN file is too large for processing. In some embodiments, the processor 202 or the lift module 208 may be configured to automatically truncate the VIN file based on the threshold number. In some embodiments, the processor 202 or the lift module 208 may also determine if all of the VIN information stored in the VIN data table is accurate or valid. For example, the processor 202 or the lift module 208 may analyze the VINs in the VIN data table to ensure that they have appropriate lengths and comprise alphanumeric values with the proper expected values in the proper locations. The processor 202 or the lift module 208 may remove VINs and associated information that do not meet these criteria. Additionally, the processor or the lift module 208 may remove duplicate VINs from the VIN data table. Accordingly, the processor 202 or the lift module 208 may compare the quantity of VINs in the VIN data table after removal of the VINs as described herein.

At block 604, the processor 202 or the lift module 208 may read the VIN data table and start the batch processing of the processed VIN data file. The processing of the VIN data table may include the processor 202 or the lift module 208 identifying for each VIN in the VIN data table what event records are available in either public sources (sources that are available to anyone) or exclusive sources (e.g., sources that are exclusive to the historical report valuation system 108). The processor 202 or the lift module 208 may also analyze the records for each VIN and determine a number of VINs of the VIN data table for which an event record only exists from the exclusive sources. For example, the exclusive sources may include information for an accident for one of the VINs in the VIN data table that is not included in the public sources. Details of the analysis of the VINs in the VIN data table are provided below in relation to FIG. 10.

Once the processor 202 and the lift module 208 perform the batch process at block 604, the processor 202 or the lift module 208 generates a report of the results of the analysis of the VIN data table at block 606. The report may be generated as a spreadsheet or text file or any other format. Once the report is generated, the report may be compressed at block 608 by the processor 202 or the lift module 208 and transmitted to the user at block 610. In some embodiments, the information received from the user at block 502 with the VIN file may be stored in the VIN data file (e.g., the contact information, the merchant name, etc.).

Figure 7:
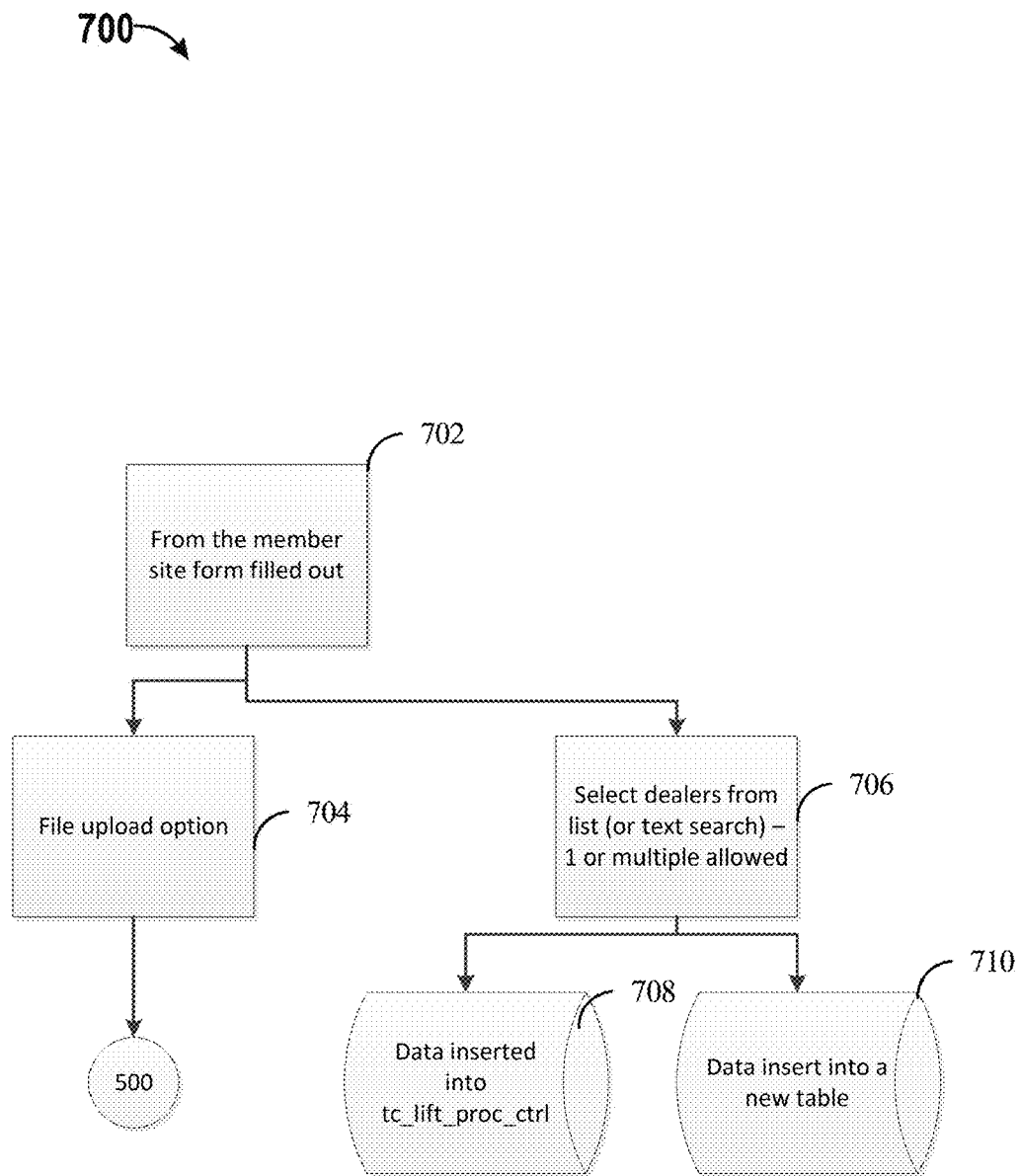
FIG. 7 is a data flow diagram for another method of obtaining information for generation of a lift report by the system of FIG. 1.

FIG. 7 is a data flow diagram for another method 700 of obtaining information for generation of a lift report by the system 100 of FIG. 1. Method 700 is an exemplary description of a method that may involve the user using the terminal 102 or one of the computing devices 106 and the historical report valuation system 108. Methods similar to method 700 may be run simultaneously, in an overlapping manner, or sequentially for multiple dealers or users that are each accessing the historical report valuation system 108 via one or more terminals 102 or via users with computing devices 106. In some embodiments, particular steps of the method 700 may be implemented by the processor 202, as referenced in FIG. 2. In some embodiments, one or more of the steps of the method 700 are implemented by one or more of the other components of the historical report valuation system 108, as referenced in FIGS. 1 and 2. In some embodiments, the blocks of the method 700 are performed in a sequential manner, while in other embodiments, the blocks of the method 700 may be performed in a non-sequential manner, regardless of the terminology used to describe the method 700 herein. A person having ordinary skill in the art will appreciate that the method 700 may be implemented by other suitable devices and systems. Although the method 700 is described herein with reference to a particular order, in various aspects, blocks herein may be performed in a different order, or omitted, and additional blocks may be added.

At block 702, the processor 202 or the lift module 208 may receive information from the user regarding generating the lift report (e.g., site login information, etc.). At block 704, the processor 202 or the lift module 208 may proceed through the process of method 500 of FIG. 5 for obtaining information from the user through the upload of the VIN file and input of corresponding information. Alternatively, or additionally, at block 706, the user may select the dealer for which the report is to be run from a list of dealers. The list may correspond to dealers for which the VIN file and corresponding contact information, etc., that would otherwise be manually entered as described in relation to method 500 of FIG. 5 is already loaded or stored into the memory 206. Once the dealer is selected from the list, data related to the dealer (e.g., the VIN list) stored in the memory may be copied to or inserted into the VIN data table if one already exists at block 708 or inserted into a new VIN data table if one does not already exist for the selected dealer at block 710. In some embodiments, the validation of the VIN list stored in the memory 206 may occur offline or may be performed once the VIN list is copied to the VIN data table. Accordingly, the VIN data tables stored may only include the appropriate quantity of VINs and only valid VINs. In some embodiments, the VIN files or data tables being handled and uploaded, and the resulting reports, may be very large based on the number of VINs included therein. Thus, the various compression methods discussed herein may be used to reduce sizes of files. Furthermore, the verification/validation of VINs in the VIN file and/or VIN data tables may be used to reduce unnecessary processing and communication of excessively large files. Furthermore, the VIN files or data tables may be limited in size to further reduce the need to process large quantities of data and communicate the large quantities of data.

Figure 8:
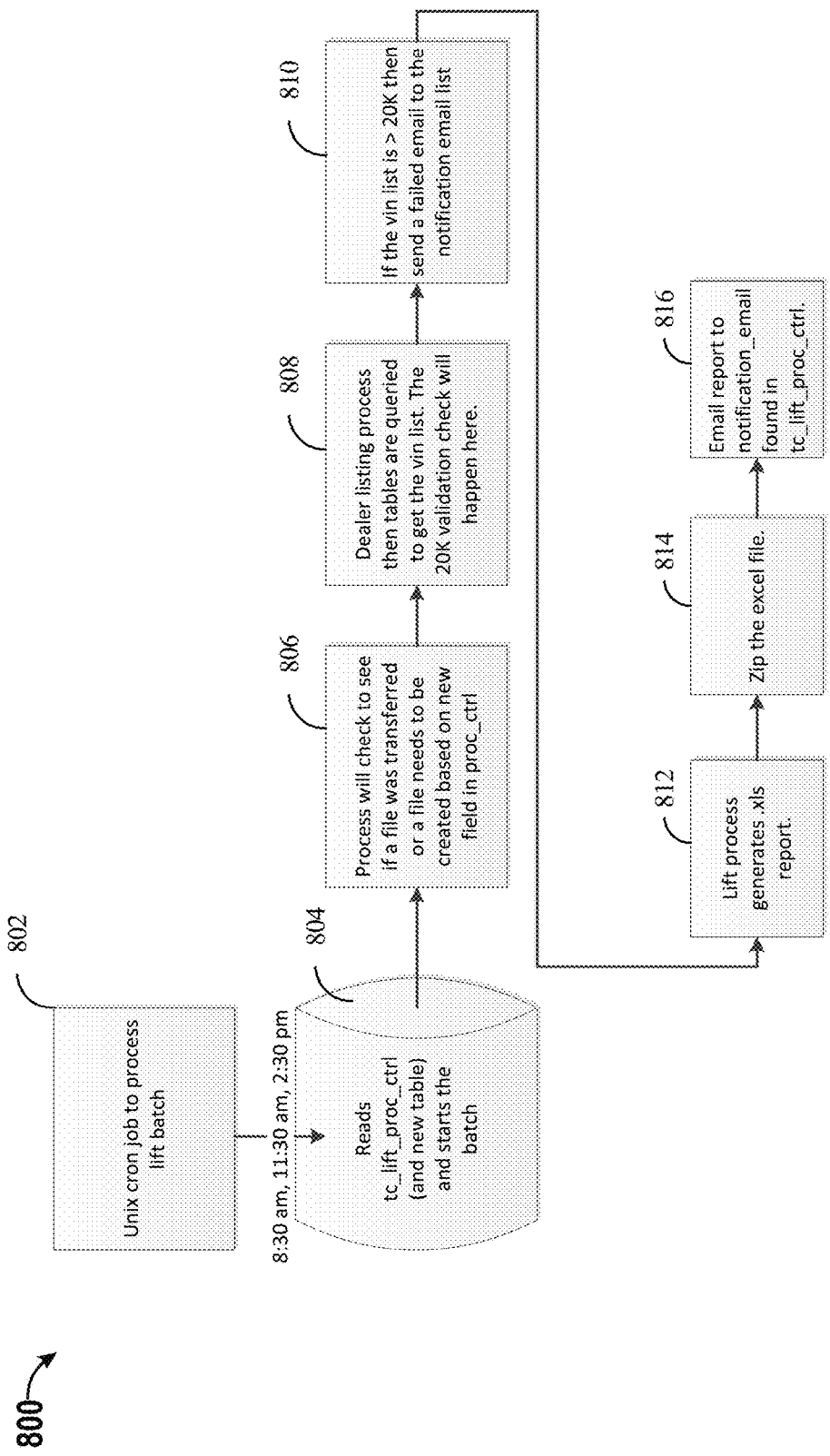
FIG. 8 is a data flow diagram for generating a lift report according to the data of the flow diagram of FIG. 7.

FIG. 8 is a data flow diagram for a method 800 of generating a lift report according to the data of the flow diagram of FIG. 7. Method 800 is an exemplary description of a method that may involve the user using the terminal 102 or one of the computing devices 106 and the historical report valuation system 108. Methods similar to method 800 may be run simultaneously, in an overlapping manner, or sequentially for multiple dealers or users that are each accessing the historical report valuation system 108 via one or more terminals 102 or via users with computing devices 106. In some embodiments, particular steps of the method 800 may be implemented by the processor 202, as referenced in FIG. 2. In some embodiments, one or more of the steps of the method 800 are implemented by one or more of the other components of the historical report valuation system 108, as referenced in FIGS. 1 and 2. In some embodiments, the blocks of the method 800 are performed in a sequential manner, while in other embodiments, the blocks of the method 800 may be performed in a non-sequential manner, regardless of the terminology used to describe the method 800 herein. A person having ordinary skill in the art will appreciate that the method 800 may be implemented by other suitable devices and systems. Although the method 800 is described herein with reference to a particular order, in various aspects, blocks herein may be performed in a different order, or omitted, and additional blocks may be added.

The method 800 may begin at block 802, where the processor 202 or the lift module 208 may initiate or generate a batch process to analyze the data for the dealer selected in method 700 of FIG. 7. The VIN data table(s) of the selected dealer(s) may be processed in batch at particular times of day due to processing required by the quantity of VINs that may exist in the VIN data file. For example, the batch processing of the VIN data table (and other VIN data tables from other user uploads of VIN files) may all occur at 8 am, 12 pm, and 4 pm. In some embodiments, the batch processing of the VIN data table(s) may occur at off-peak hours, such as at 10 pm, 1 am, and 4 am.

At block 804, the processor 202 or the lift module 208 may read the existing and/or new VIN data table(s) and start the batch processing of the VIN data table(s). The VIN data table may be a new data table or may be previously stored in the memory 206 or some other memory location. Once the VIN data table(s) is read and the batch is started, at block 806, the processor 202 or the lift module 208 may determine whether a file was transferred or a file needs to be created based on a new field.

At block 808, the processor 202 or the lift module 208 validates the VINs in the VIN data table. In some embodiments, validating the VINs may involve reviewing the VIN data table, as discussed herein. For example, the processor 202 or the lift module 208 may check to see if the quantity of VINs in the VIN data table exceeds a threshold number. If so, the processor 202 or the lift module 208 may generate a message indicating that the VIN file is too large for processing at block 810. In some embodiments, the processor 202 or the lift module 208 may be configured to automatically truncate the VIN file based on the threshold number. In some embodiments, the processor 202 or the lift module 208 may also determine if all of the VIN information stored in the VIN data table is accurate or valid. For example, the processor 202 or the lift module 208 may analyze the VINs in the VIN data table to ensure that they have appropriate lengths and comprise alphanumeric values with the proper expected values in the proper locations. The processor 202 or the lift module 208 may remove VINs and associated information that do not meet these criteria. Additionally, the processor or the lift module 208 may remove duplicate VINs from the VIN data table. Accordingly, the processor 202 or the lift module 208 may compare the quantity of VINs in the VIN data table after removal of the VINs as described herein. In some embodiments, the checks of the VIN information may be performed when the VIN data table is created and the processor 202 or the lift module 208 may assume that the VIN data table is already verified and ready to batch process.

At block 812, the processor 202 or the lift module 208 generates a report regarding the analysis of the VIN data table. This analysis may include processing the VIN data table by the processor 202 or the lift module 208 and identifying for each VIN in the VIN data table what event records are available in either public sources (e.g., the vehicle history data store 104) and exclusive sources (e.g., the exclusive vehicle history data store 109). The processor 202 or the lift module 208 may also analyze the records for each VIN and determine a number of VINs of the VIN data table for which an event record only exists from the exclusive vehicle history data store 109. For example, the exclusive vehicle history data store 109 may include information for an accident for one of the VINs in the VIN data table that is not included in the vehicle history data store 104. Details of the analysis of the VINs in the VIN data table are provided below in relation to FIG. 10. The report generated at the processor 202 or the lift module 208 may be a spreadsheet or text file or a file of any other format. Once the report is generated, the report may be compressed at block 814 by the processor 202 or the lift module 208 and transmitted to the user at block 816.

FIG. 9 is an example of a screenshot of the lift report 900 generated by the historical report valuation system 108 of FIG. 1, in accordance with an exemplary embodiment. The lift report 900 may include various sections of data. For example, the lift report may include file statistics section 902, reported issues section 904, accidents/damage events section 906, and total exclusive events section 908. Each of these sections may include information that is generated or identified based on the VIN data table discussed herein and the comparison of events associated with VINs in the VIN data table. In some embodiments, the lift report 900 is generated by one of the processor 202, the lift module 208, and the dealership report module 216. In some embodiments, the generated lift report may not include all of the information shown in FIG. 9 or discussed below. In some embodiments, the generated lift report may include additional information not shown in FIG. 9.

The file statistics section 902 may include general or overview information regarding the VIN file or VIN data table that was analyzed by the processor 202 or the lift table 208 as discussed in relation to FIGS. 5-8. For example, the file statistics section 902 may include a total number of VINs 902a that were included in the VIN file and/or the VIN data table before any verification or validation processes were performed. The total number of VINs 902a may be determined by the processor 202 or the lift module 208 by counting the VINs in the VIN file or the VIN data table or based on the number of records in the VIN file as entered in prompt 406 of FIG. 3. Thus, the total number of VINs 902*a* may include duplicate VINs, incomplete VINs, etc. The file statistics section 902 also includes a number of VINs processed 902*b* by the processor 202 or the lift module 208. This may include only the validated or verified VINs (e.g., after incomplete VINs or duplicate VINs are removed). Thus, the number of VINs processed 902*b* should be less than or equal to the total number of VINs 902*a*.

The file statistics section 902 also includes a number of VINs having records 902*c*. This may include the number of VINs for which event records were found in at least one of the vehicle history data store 104 or the exclusive vehicle history data store 109. The number of VINs having records 902*c* should be less than or equal to the number of VINs processed 902*b*. The file statistics section 902 also includes a number of VINs with negative events 902*d*. This may include the number of VINs for which negative event records (e.g., event regards that have a depreciating impact on the value of the associated vehicle) were found in at least one of the vehicle history data store 104 or the exclusive vehicle history data store 109. The number of VINs with negative events 902*d* should be less than or equal to the number of VINs having records 902*c*. Finally, the file statistics section 902 also includes a percentage 902*c* based on the number VINs with negative events 902*d* relative to the number of VINs having records 902*c*. This percentage may show how many VINs have negative events relative to how many VINs have any event history records.

The reported issues section 904 may include a breakdown of non-accident/damage events that were identified by the processor 202 or the lift module 208 for the VINs that were processed. The reported issues section 904 may be divided into three columns: (1) Reported Issues; (2) Shared Sources; and (3) Private Sources. The reported issues may include collision related events, auto insurance source reported events, exclusive auction announced data, total VINs with reported issues, percentage of VINs with records or negative events reported, and exclusive data lift based on the reported issues. Each of these reported issues may include values in the Shared Sources and/or Private Sources columns. The values in these columns may correspond to a number of VINs having records identifying the reported issues. For example, the shared sources and the exclusive sources both identified 10 VINs in the processed VIN data table that have collision related events that were reported. Accordingly, both the exclusive and public sources were able to provide the same level of reporting for the collision related events. Similarly, both the exclusive and public sources were able to provide the same level of reporting for the auto insurance source reported events. The reported issues section 904 shows, however, that the private or exclusive sources are able to provide auction announced data that is not available from public sources. Thus, the total number of VINs with reported issues from the public sources is 12, with a percentage of 3.82%, while the total number of VINs with reported issues from the exclusive sources is 16, with a percentage of 5.10% of the total VINs with event records. Thus, the exclusive sources are able to provide an exclusive data lift of 1.27% based on the reported issues.

The accidents/damage events section 906 may include a breakdown of accident/damage events that were identified by the processor 202 or the lift module 208 for the VINs that were processed. The accidents/damage events section 906 may be divided into three columns: (1) Accidents and Damage Related Events; (2) Shared Sources; and (3) Private Sources. The accidents and damage related events may include total accidents and damage related events, exclusive accidents and damage related events, percentage of VINs with records with accidents and damage, and exclusive data lift. Each of these accidents and damage related events may include values in the Shared Sources and/or Private Sources columns. The values in these columns may correspond to a number of VINs having records identifying accidents and/or damage related events. For example, the shared sources identified 96 VINs in the processed VIN data table that have accidents and damage related events that were reported while the exclusive sources identified 116 VINs in the processed VIN data table having accidents and damage related events. Accordingly, the exclusive sources were able to provide a greater level of reporting for the accident and damage related events as compared to the public sources. The exclusive accidents and damage related events show that there were 20 accident or damage events that the exclusive source identified that were not identified in the public sources. Thus, the percentage of VINs with records with accidents and damage as identified by the public sources is 30.57% while the percentage of VINs with records with accidents and damage as identified by the exclusive sources is 36.94%. Thus, the exclusive data lift provided by the exclusive sources is 6.37%.

The total exclusive events section 908 may include a breakdown of total exclusive events that were identified by the processor 202 or the lift module 208 for the VINs that were processed. The total exclusive events section 908 may be divided into two columns: (1) Total Exclusive Events; and (2) Private Sources. The total exclusive events section 908 may summarize the exclusive information that was identified in the lift report, including the exclusive auction announced data and the exclusive accident and damage related events. Since there were 4 records of exclusive auction announced data and 20 records of exclusive accident events, there are a total of 24 total exclusive data events, which is 7.64% of the total number of VINs having records (e.g., 902*c*). Thus, the lift generated by the exclusive sources, as identified by the lift report, is 7.64%.

Figure 10:
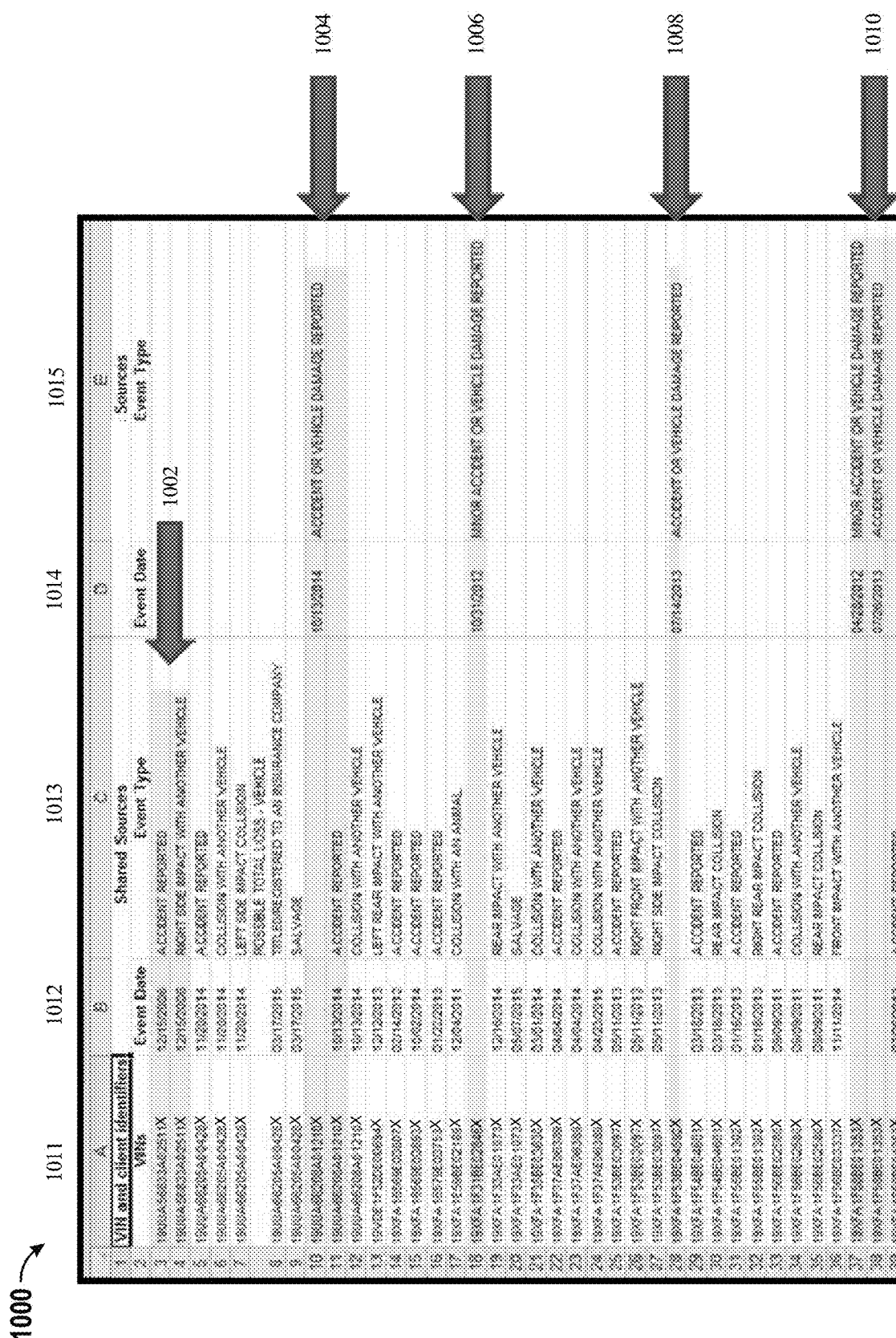
FIG. 10 is an example of rules applied when analyzing a VIN data table with the system of FIG. 1.

FIG. 10 is an example spreadsheet 1000 that may be generated when generating a lift report 900 of FIG. 9 with the historical report valuation system 108 of FIG. 1. The sample VINs provided in the spreadsheet 1000 may have been previously validated. The VINs in the spreadsheet 1000 may only include VINs from a VIN data table having event information for which records were identified in one or both of the vehicle history data store 104 or the exclusive vehicle history data store 109. Thus, number of VINs in the spreadsheet 1000 may be only a small fraction of the VINs in the corresponding VIN data table. In some embodiments, the information in the spreadsheet 1000 may be used to generate the lift report described herein.

The spreadsheet 1000 may include a column 1011 for VINs of vehicles for which events are being compared, a column 1012 for event date for events identified in the public vehicle history data store 104, and a column 1013 for event type for events identified in the public vehicle history data store 104. The spreadsheet also include a column 1014 for event date for events identified in the exclusive vehicle history data store 109 and a column 1015 for event type for events identified in the exclusive vehicle history data store 109.

One of the processor 202 or the lift module 208 may generate the spreadsheet 1000 to provide details of event record for VINs in the analyzed or processed VIN data table. For example, any VIN in the VIN data table for a particular dealer may have accident event records reported from one or more sources (e.g., the vehicle history data store 104 and the exclusive vehicle history data store 109). Information regarding any identified accident event records or similarly negative event records may be included in the spreadsheet 1000.

The spreadsheet 1000 is sorted by VIN (1011) and then event date (1012). If a VIN from the VIN data table does not have any reported activity (e.g., no event records in either the vehicle history data store 104 or the exclusive vehicle history data store 109), that particular VIN will not be displayed on the spreadsheet. The spreadsheet 1000 includes examples of rules that may be used when generating the lift report described herein.

A first rule may relate to identifying events for inclusion in the lift report. The first rule may correspond to ensuring that the same event is not counted multiple times when generating the lift report. For example, an accident that happens on an interstate highway may include event records in multiple public data stores. Accordingly, the first rule may ensure that the event is only counted once for the lift report. For example, the accident may result in two record events for a single VIN in shared sources column 1013, as shown at indicator 1002. These events may be identified in more than one source, but each source may indicate that the event was an accident and each source may indicate that the accident occurred on the same date (Dec. 15, 2006). Thus, when generating the lift report, the processor 202 or the lift module 208 may count these records as a single event or instance that is not exclusive to the exclusive source. Thus, events of same types and dates will only count as a single event regardless of how many public sources include information regarding those events.

A second rule may similarly relate to identifying events for inclusion in the lift report when the same event is identified in both the exclusive vehicle history data store 109 and the vehicle history data store 104 (or any other data sources). The second rule, similar to the first rule, may correspond to ensuring that the same event is not counted multiple times when generating the lift report. For example, the accident that happens on an interstate highway may include event records in both public and exclusive data stores. Accordingly, the second rule may ensure that the event is only counted once for the lift report. For example, the accident may result in a record event for the single VIN in the vehicle history data store 104 (column 1013) and another record event for the single VIN in the exclusive vehicle history data store 109 (column 1015), as shown at indicator 1004. These events may be identified in more than one source, but each source may indicate that the event was an accident (columns 1013/1015) and each source may indicate that the accident occurred on the same date (columns 1012/1014). Thus, when generating the lift report, the processor 202 or the lift module 208 may count these records as a single event or instance that is not exclusive to the exclusive source. Accordingly, events of same types and dates will only count as a single event regardless of how many sources, exclusive or public, include information regarding those events.

A third rule may relate to identifying events for inclusion in the lift report when an event is only identified in the exclusive vehicle history data store 109. The third rule may ensure that the events that are exclusive to the historical report valuation system 108 are counted and/or considered when generating the lift report. For example, an accident that happens on a private road may include event records in only exclusive data stores (e.g., the exclusive vehicle history data store 109). As shown, only one record for the VIN is identified and that record is from the exclusive vehicle history data store 109. Accordingly, the third rule may ensure that the event is counted as an exclusive event for the lift report. Thus, when generating the lift report, the processor 202 or the lift module 208 may count the record identified at 1006 as a single event or instance that is exclusive. Similarly, the record shown at 1008 is from the exclusive vehicle history data store 109 and is not duplicative of a record from the vehicle history data store 104. Thus, the third rule counts the record at 1008 as an exclusive event for the lift report.

A fourth rule may relate to identifying events for inclusion in the lift report when the multiple similar events are identified in both the exclusive vehicle history data store 109 and the vehicle history data store 104 (or any other data sources) but when the dates of the corresponding records are not identical. The fourth rule, similar to the first and second rules, may correspond to ensuring that the same event is not counted multiple times when generating the lift report. For example, the accident that happens on an interstate highway may include event records in both public and exclusive data stores. However, contrary to the events of 1002 and 1004 above, the events of 1010 may not have identical dates. For example, the accident event of column 1013 with the date of Jul. 26, 2013 in column 1012 may be similar to the accident event of column 1015 having the date of Jul. 26, 2013 in column 1014 but different from the accident event of column 1015 having the date of Apr. 28, 2012 in column 1014. However, the fourth rule may dictate that there accident records are attributed to the public source even though one of them appears to be exclusive to the exclusive vehicle history data store 109. Thus, when generating the lift report, the processor 202 or the lift module 208 may count these records as a single event or instance that is not exclusive. Accordingly, events of same types and same or similar dates will only count as a single, publicly available event regardless of how many sources, exclusive or public, include information regarding those events.

An additional rule (not shown) may involve sale dates that are included in the VIN data table. The sale dates may correspond to dates on which the dealer sold the vehicle having the identified VIN. The sale dates, if available in the VIN data table, may also be used to exclude events from the lift report. Based on the sale date, the processor 202 or the lift module 208 may exclude events that are in the exclusive sources that occur after the sale date because knowledge of these events in the exclusive sources may not be beneficial to the dealer. For example, if the dealer no longer owns the vehicle (e.g., after the sale date when the vehicle was sold to a buyer), the dealer likely does not care about any events associated with that VIN, so they will not be included when generating the lift report.

Figure 11:
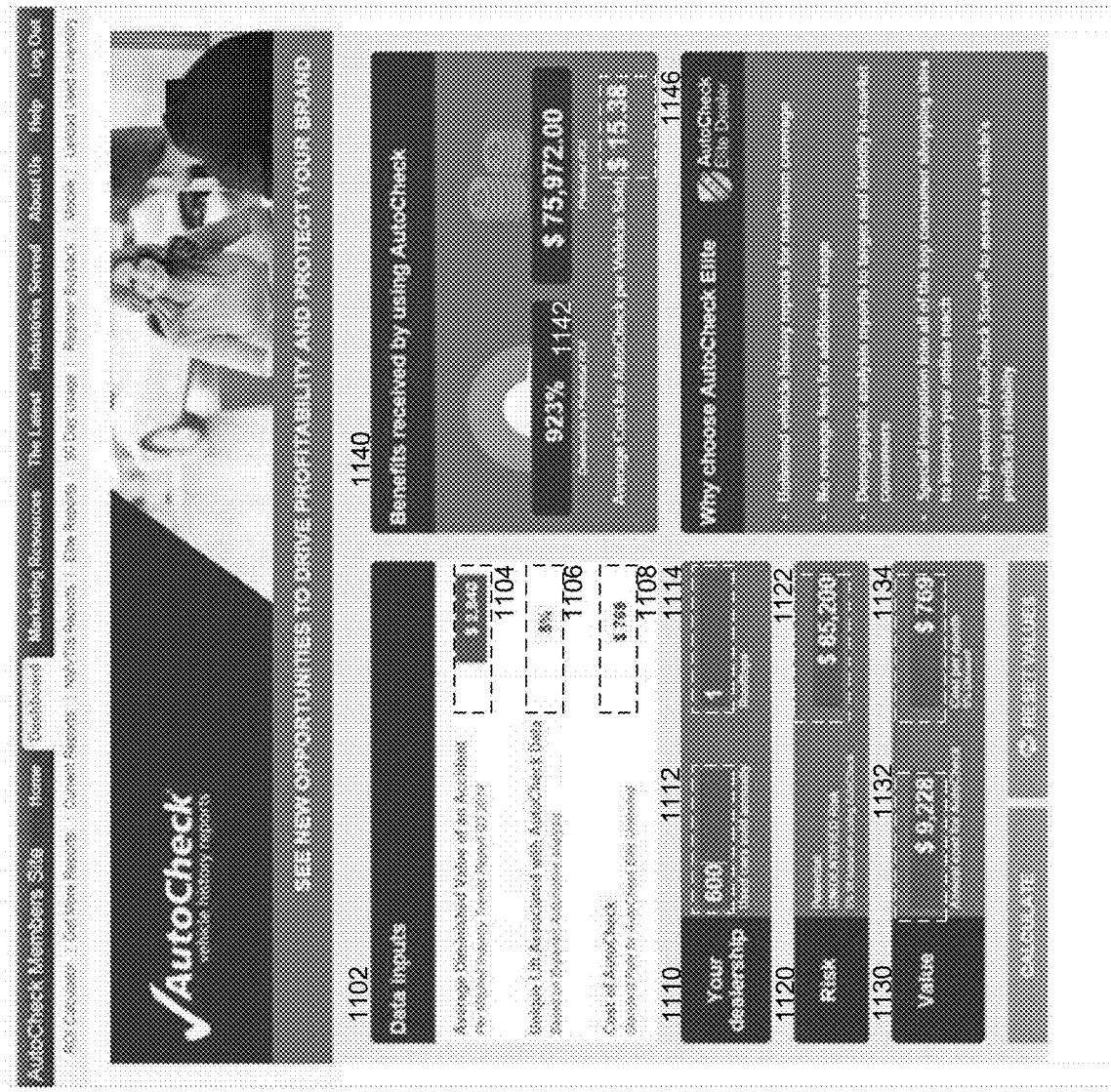
FIG. 11 is an example of a screenshot of a website used to generate a report by the system of FIG. 1.

FIG. 11 is an example of a screenshot including an ROI website 1100 as maintained and/or provided by the historical report valuation system 108 of FIG. 1. The ROI website 1100 shown may be generated by one of the user interface module 214, the I/O interfaces and device 204, and the dealership report module 216 of the FIG. 2. In some embodiments, one or more values displayed on the ROI website 1100 may be based on the lift determination or report generated by the lift module 208. The ROI website 1100 may convey information regarding the benefit of the historical report valuation system 108, e.g., the exclusive vehicle history data stores, to the dealer and/or the user. The ROI website 1100 may detail, based on general and specific information regarding the dealer, an amount of money that the dealer may save by having access to the exclusive vehicle history data stores associated with the historical report valuation system 108.

In some embodiments, any of the values shown may be generated based on default values as identified from market research or averages of various dealers. In some embodiments, the values shown may be generated based on information particular to each dealer utilizing the ROI website 1100. Some of the information used in the ROI website may be determined based on the lift report 900 or the spreadsheet 1000.

The ROI website 1100 may include both outputs generated by the historical report valuation system 108 and/or input by the user and/or one or more modules of the historical report valuation system 108. The ROI website 1100 includes a first section 1102 identified as "Data Inputs." The Data Inputs field 1102 may comprise the information that the dealership report module 216 uses to generate the dealership report and/or the lift values. For example, the Data Inputs field includes an average diminished value 1104, a dealer lift 1106, and a cost of access to the exclusive vehicle history data stores 109. The value 1104 may comprise a dollar amount equal to a price reduction that is caused by a negative event on any vehicle's vehicle history report. For example, as shown in the value 1104, the amount $2840 may suggest that a vehicle without any negative events in its vehicle history may have a projected value that is $2840 higher than the same vehicle having one or more negative events in its vehicle history. The lift 1106 may comprise the lift, as described above, determined based on the dealer's inventory. In some embodiments, the lift generated by the lift module 208 above may be configured to automatically load or import into the dealership report module 216 for inclusion on the ROI website 1100 and for generating the dealer's lift. The cost of the access to the one or more exclusive vehicle history data stores 109 may be a subscription or access fee for use of the one or more private vehicle history data stores to obtain vehicle history reports for all used vehicles in the dealer's inventory, shown in 1108. In some embodiments, any of the fields may be user adjustable or may be automatically established by the historical report valuation system 108 based on external inputs and/or information.

The ROI website 1100 includes a second section 1110 identified as "Your Dealership." This section 1110 may include information received by the historical report valuation system 108 that is used to help generate the dealer's dealership report. As shown, the dealer having the dealership report with the lift as shown has a sales value 1112 indicating that the dealer sells 600 cars annually from a single dealership (e.g., number of rooftops 1114). The ROI website 1100 includes a third section 1120 with a single "risk" field 1122. The risk field 1122 may include a dollar amount of risk determined based on the lift 1106, the average diminished value 1104, and the car sales value 1112. For example, the Risk field 1122 may correspond to $2840*600*5%=$85,200. In some embodiments, one or more of the fields of the second section 1110 may be provided by the dealer (e.g., via the terminal 102). For example, the sales value 1112 and the number of rooftops may be provided by the dealer (or by the user via the mobile terminal 106). The risk field 1122 may be determined by one or more modules of the historical report valuation system 108 of FIG. 1 as part of a dealership report generating step.

The ROI website 1100 includes a fourth section 1130 that indicates the annual cost 1132 of access to the one or more exclusive vehicle history data stores and the cost per month 1134 of access to the one or more exclusive vehicle history data stores. The ROI website 1100 includes a fifth section 1140 includes a percentage 1142, the dollar amount 1144, and a cost of access to the one or more exclusive vehicle history data stores per vehicle sold 1146. The percentage 1142 corresponds to the risk field 1122 divided by the annual cost 1132. The dollar amount 1144 corresponds to the risk field 1122 reduced by the annual cost 1132. The cost per vehicle 1146 corresponds to the annual cost 1132 divided by the sales value 1112. The annual cost 1132 and the cost per month 1134 may be determined by one or more modules of the historical report valuation system 108 of FIG. 1 as part of a dealership report generating step. Furthermore, the percentage 1142, the dollar amount 1144, and the cost of access 1146 may also be determined by one or more modules of the historical report valuation system 108 of FIG. 1 as part of a dealership report generating step.

In some embodiments, the ROI website 1100 may be configured to show determinations and/or dealership reports for more than one dealer on a single screen, thereby allowing for simplified comparisons. In some embodiment, additional data inputs may be provided regarding the various (e.g., lift) thresholds. In some embodiments, the ROI website 1100 may further include a dealer rating or level (not shown) generated based on the lift and/or other information shown in the ROI website 1100.

In some embodiments, the dealer lift 1106 may be determined based on the lift identified in the report 900. In such as case, the ROI website 1100 may generate an ROI that is specific to the dealer using the ROI website 1100.

Figure 12:
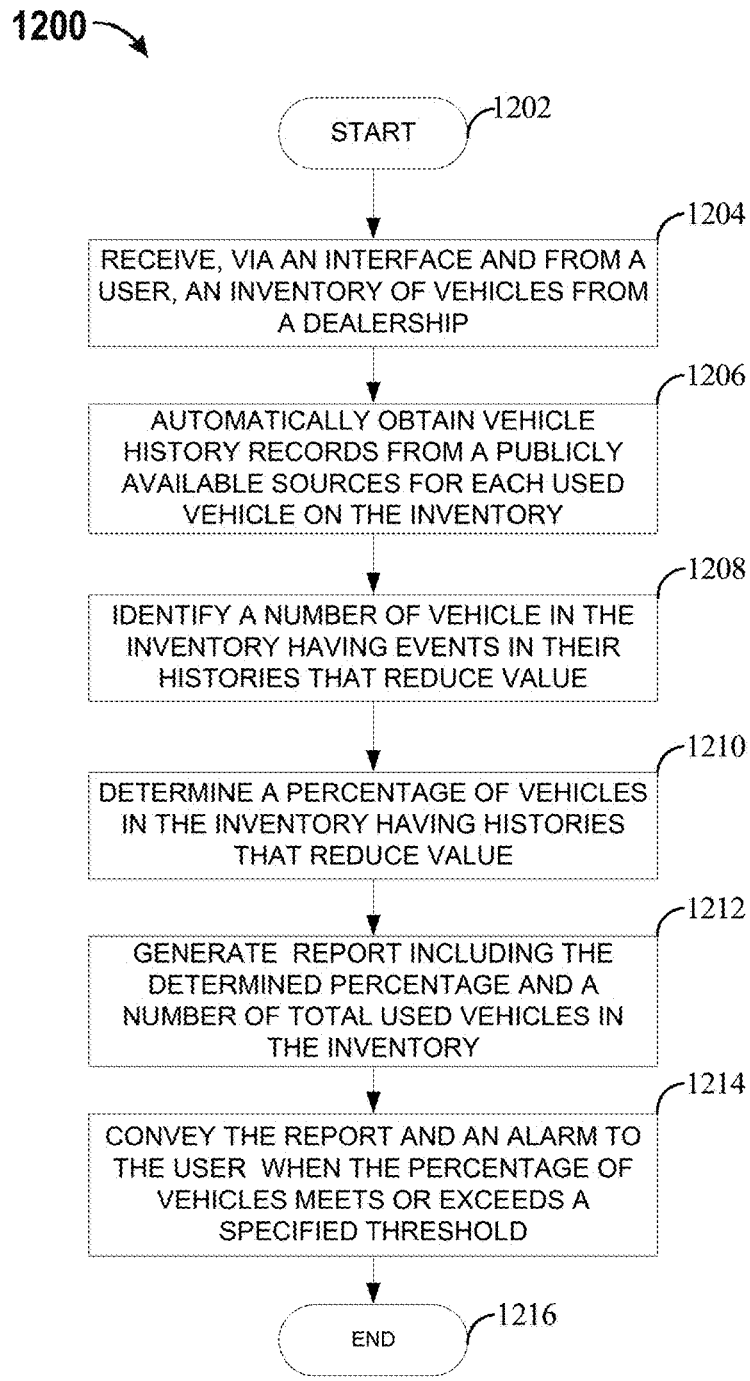
FIG. 12 is a process flowchart illustrating an example method of generating the report provided by the system of FIG. 1, in accordance with an exemplary embodiment.

FIG. 12 is a process flowchart illustrating an example method 1200 of generating a lift value and/or a dealership report based on the lift value by the historical report valuation system 108 service, in accordance with an exemplary embodiment. Method 1200 is an exemplary description of a method that may involve the dealer (e.g., the terminal 102) and the historical report valuation system 108. Methods similar to method 1200 may be run simultaneously, in an overlapping manner, or sequentially for multiple dealers that are each accessing the historical report valuation system 108 via one or more dealer terminals 102 or via users with computing devices 106. In some embodiments, particular steps of the method 1200 may be implemented by the processor 202, as referenced in FIG. 2. In some embodiments, one or more of the steps of the method 1200 are implemented by one or more of the other components of the historical report valuation system 108, as referenced in FIGS. 1 and 2. In some embodiments, the blocks of the method 1200 are performed in a sequential manner, while in other embodiments, the blocks of the method 1200 may be performed in a non-sequential manner, regardless of the terminology used to describe the method 1200 herein. A person having ordinary skill in the art will appreciate that the method 1200 may be implemented by other suitable devices and systems. Although the method 1200 is described herein with reference to a particular order, in various aspects, blocks herein may be performed in a different order, or omitted, and additional blocks may be added.

Method 1200 begins at block 1202 and moves to block 1204. Block 1204 includes receiving, via the interface, an inventory of vehicles, the inventory comprising at least one vehicle identified by at least one of a vehicle identification number (VIN), a license plate number, or other unique vehicle identifier. In some embodiments, the inventory of vehicles may be received from the computing device 106 or the terminal 102, via the network 110. In some embodiments, the inventory may comprise a request to provide and/or generate a lift and/or dealership report based on one or more exclusive vehicle history data stores. In some embodiments, the inventory and/or request may comprise a date and/or time at which the report(s) and/or determination(s) are desired. In some embodiments, the dealer inventory may be associated with a dealer account that includes previous inventories and/or previous historical report valuation determinations and reports.

From block 1204, the method 1200 moves to block 1206. Block 1206 includes obtaining vehicle history records from one or more sources for each vehicle in the inventory when the inventory is received. In some embodiments, the historical report valuation system 108 may use publicly shared vehicle history data stores 104 to obtain the vehicle history records for each vehicle in the inventory. In some embodiments, requesting the vehicle history records may require the dealer to opt in to having a lift or dealership rating or level generated for comparison to other dealerships.

From block 1206, the method 1200 moves to block 1208. Block 1208 includes identifying, based on the obtained vehicle history records, a number of vehicles in the inventory having events in their respective histories that reduce values of the respective vehicles.

From block 1208, the method 1200 moves to block 1210. Block 1210 includes automatically determining a percentage of vehicles in the inventory having events that reduce the values of the respective vehicles. The method 1200 also includes steps of block 1212. Block 1212 includes automatically generating a report including the determined percentage from block 1210. The report may be generated to include either or both of the dealer lift or dealership report information, as determined by the historical report valuation system 108. In some embodiments, the report may also include a listing of all the events identified by the data stores. The method 1200 also includes steps of block 1214, before proceeding to end at block 416. Block 1214 comprises automatically conveying the report to the user via the communication circuit with an alarm or notification when the percentage of vehicles in the inventory having events that reduce the values of the respective vehicles meets or exceeds a specified threshold.

For any discussions of dealers herein can be replaced with any one of a consumer, a vehicle listing website, a lender, or any similar entity involved in vehicle sales and/or records. Furthermore, dealers and vehicles as described herein may be replaced with any other provider and good where a history of the good is tracked (e.g., real estate, etc.).

Any of the components or systems described herein may be controlled by operating system software, such as Windows XP, Windows Vista, Windows 7, Windows 8, Windows Server, UNIX, Linux, SunOS, Solaris, IOS, Android, Blackberry OS, or other similar operating systems. In Macintosh systems, the operating system may be any available operating system, such as MAC OS X. In other embodiments, the components or systems described herein may be controlled by a proprietary operating system. Conventional operating systems control and schedule computer processes for execution, perform memory management, provide file system, networking, I/O services, and provide a user interface, such as a graphical user interface ("GUI"), among other things.

In some embodiments, data stores and/or databases described herein may be implemented using a relational database, such as Sybase, Oracle, CodeBase and Microsoft® SQL Server as well as other types of databases such as, for example, a flat file database, an entity-relationship database, and object-oriented database, and/or a record-based database.

Computing devices, which may comprise the software and/or hardware described above, may be an end user computing device that comprises one or more processors able to execute programmatic instructions. Examples of such computing devices are a desktop computer workstation, a smart phone such as an Apple iPhone or an Android phone, a computer laptop, a tablet PC such as an iPad, Kindle, or Android tablet, a video game console, or any other device of a similar nature. In some embodiments, the computing devices may comprise a touch screen that allows a user to communicate input to the device using their finger(s) or a stylus on a display screen.

The computing devices may also comprise one or more client program applications, such as a mobile "app" (e.g. iPhone or Android app) that may be used to visualize data, and initiate the sending and receiving of messages in the computing devices. This app may be distributed (e.g. downloaded) over the network to the computing devices directly or from various third parties such as an Apple iTunes or Google Play repository or "app store." In some embodiments, the application may comprise a set of visual interfaces that may comprise templates to display vehicle history reporting and financing information. In some embodiments, as described above, visual user interfaces may be downloaded from another server or service. This may comprise downloading web page or other HTTP/HTTPS data from a web server and rendering it through the "app". In some embodiments, no special "app" need be downloaded and the entire interface may be transmitted from a remote Internet server to computing device, such as transmission from a web server to an iPad, and rendered within the iPad's browser.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the vehicle history reporting and financing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the system distinguishes between the initial transmission of loan application data required for user interfaces, and subsequent transmissions of user interface data so that it may transmit only portions that are necessary to update a vehicle history reporting and financing user interface. This may be done, for example, using an XMLHttpRequest (XHR) mechanism, a data push interface, Asynchronous JavaScript and XML ("Ajax"), or other communication protocols.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the vehicle history reporting and financing system 100, consumer computing device 162, and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system comprising:
  a communication portal configured to transmit and receive information over a communication network;
  an interface configured to allow user operation and interaction via the communication network; and
  a processor configured to execute computer-executable instructions in order to:
    access, from one or more databases, one or more database records for each alphanumeric record in a list of validated alphanumeric records received via the interface and associated with a first entity, wherein at least one unique vehicle identifier exists for each alphanumeric record and each alphanumeric record is associated with a vehicle, wherein each database record includes a history of vehicle events associated with the at least one unique vehicle identifier;
    identify, for each of the one or more database records, a vehicle event for inclusion in an electronic event notification based on applying one or more rules associated with the first entity to the one or more database records;
    determine a plurality of subsets of vehicle events, wherein each subset of vehicle events is associated with a negative history event type;
    determine a count of vehicle events for each of the plurality of subsets of vehicle events;
    in response to a determination that an estimated risk associated with the count of vehicle events exceeds a corresponding threshold value, automatically generate the electronic event notification; and transmit, to a remote user device via the communication portal, the electronic event notification.

2. The system of claim 1, wherein the processor is further configured to identify multiple similar vehicle events between different database records and generates a single vehicle event for a report in place of the multiple similar vehicle events based on a first rule of the one or more rules.

3. The system of claim 1, wherein at least one of the one or more databases is a private database storing historical vehicle evens, wherein the private database is not publicly accessible and wherein the processor is further configured to identify vehicle events in database records from only the private database as exclusive vehicle events based on a first rule of the one or more rules.

4. The system of claim 3, wherein the processor is further configured to identify vehicle events in database records from both the private database and at least one other database of the one or more databases as being not exclusive vehicle events based on a second rule of the one or more rules.

5. The system of claim 3, wherein one of the plurality of subsets of vehicle events is a subset of exclusive vehicle events and wherein the processor is further configured to filter the one or more database records to identify a subset of database records, wherein each record in the subset of database records includes a negative history vehicle event and is received from the private database, wherein the negative history vehicle event includes one or more of an accident, a theft, vehicle damage, or a title issue.

6. The system of claim 1, wherein the processor is further configured to exclude vehicle events that occur after a sale date identified in the one or more database records based on a first rule of the one or more rules.

7. The system of claim 1, wherein the processor generates the electronic event notification to include the unique vehicle identifiers of all database records in one of the plurality of subsets of vehicle events.

8. The system of claim 3, wherein the processor is further configured to determine a percentage of alphanumeric records in the list of validated alphanumeric records having vehicle events identified by the private database and to include the percentage in the electronic event notification.

9. The system of claim 1, wherein the processor generates the electronic event notification to further include details of one or more of the vehicle events.

10. A method of historical vehicle analysis, comprising:
accessing, from one or more databases, one or more database records for each alphanumeric record in a list of validated alphanumeric records received via an interface and associated with a first entity that allows user operation and interaction via a communication network, wherein at least one unique vehicle identifier exists for each alphanumeric record and each alphanumeric record is associated with a vehicle, wherein each database record includes a history of vehicle events associated with the at least one unique vehicle identifier;
identifying, for each of the one or more database records, a vehicle event for inclusion in an electronic event notification based on applying one or more rules associated with the first entity to the one or more database records;
determining a plurality of subsets of vehicle events, wherein each subset of vehicle events is associated with a negative history event type;
determining a count of vehicle events for each of a plurality of subsets of vehicle events;
in response to a determination that an estimated risk associated with the count of vehicle events exceeds a corresponding threshold value, automatically generating the electronic event notification; and
transmitting, to a remote user device via a communication portal, the electronic event notification.

11. The method of claim 10, further comprising:
identifying, multiple similar vehicle events between different database records; and
generating a single vehicle event for a report in place of the multiple similar vehicle events based on a first rule of the one or more rules.

12. The method of claim 10, wherein at least one of the one or more databases is a private database storing historical vehicle evens, wherein the private database is not publicly accessible and further comprising identifying vehicle events in database records from only the private database as exclusive vehicle events based on a first rule of the one or more rules.

13. The method of claim 12, further comprising identifying vehicle events in database records from both the private database and at least one other database of the one or more databases as being not exclusive vehicle events based on a second rule of the one or more rules.

14. The method of claim 12, wherein one of the plurality of subsets of vehicle events is a subset of exclusive vehicle events and further comprising filtering the one or more database records to identify a subset of database records, wherein each record in the subset of database records includes a negative history vehicle event and is received from the private database, wherein the negative history vehicle event includes one or more of an accident, a theft, vehicle damage, or a title issue.

15. The method of claim 10, further comprising excluding vehicle events that occur after a sale date identified in the one or more database records based on a first rule of the one or more rules.

16. The method of claim 10, wherein generating the electronic event notification comprises including the unique vehicle identifiers of all database records in one of the plurality of subsets of vehicle events in the electronic event notification.

17. The method of claim 12, further comprising determining a percentage of alphanumeric records in the list of validated alphanumeric records having vehicle events identified by the private database and to include the percentage in the electronic event notification.

18. The method of claim 10, wherein generating the electronic event notification comprising including details of one or more of the vehicle events in the electronic event notification.

19. Non-transitory, computer-readable storage media storing computer-executable instructions that, when executed by a computer system, configure the computer system to perform operations comprising:
accessing, from one or more databases, one or more database records for each alphanumeric record in a list of validated alphanumeric records received via an interface and associated with a first entity that allows user operation and interaction via a communication network, wherein at least one unique vehicle identifier exists for each alphanumeric record and each alphanumeric record is associated with a vehicle, wherein each database record includes a history of vehicle events associated with the at least one unique vehicle identifier;

identifying, for each of the one or more database records, a vehicle event for inclusion in an electronic event notification based on applying one or more rules associated with the first entity to the one or more database records;

determining a plurality of subsets of vehicle events, wherein each subset of vehicle events is associated with a negative history event type;

determining a count of vehicle events for each of a plurality of subsets of vehicle events;

in response to a determination that an estimated risk associated with the count of vehicle events exceeds a corresponding threshold value, automatically generating the electronic event notification; and transmitting, to a remote user device via a communication portal, the electronic event notification.

20. The non-transitory, computer-readable storage media of claim 19, wherein the computer system is further configured to perform operations comprising:

identifying multiple similar vehicle events between different database records; and generating a single vehicle event for a report in place of the multiple similar vehicle events based on a first rule of the one or more rules.

* * * * *